US009485968B2

(12) United States Patent
Jackson

(10) Patent No.: US 9,485,968 B2
(45) Date of Patent: Nov. 8, 2016

(54) BEEHIVE SYSTEM

(71) Applicant: Carl Jackson, Corbin, KY (US)

(72) Inventor: Carl Jackson, Corbin, KY (US)

( * ) Notice: Subject to any disclaimer, the term of this patent is extended or adjusted under 35 U.S.C. 154(b) by 55 days.

(21) Appl. No.: 14/482,409

(22) Filed: Sep. 10, 2014

(65) Prior Publication Data

US 2014/0378027 A1    Dec. 25, 2014

Related U.S. Application Data

(63) Continuation-in-part of application No. 13/283,977, filed on Oct. 28, 2011, now abandoned.

(51) Int. Cl.
*A01K 47/06* (2006.01)
*A01K 47/02* (2006.01)
*A01K 47/00* (2006.01)

(52) U.S. Cl.
CPC ............... *A01K 47/02* (2013.01); *A01K 47/00* (2013.01); *A01K 47/06* (2013.01)

(58) Field of Classification Search
CPC ...... A01K 47/00; A01K 47/04; A01K 47/06; A01K 53/00
USPC .......... 449/3, 15, 16, 20, 21, 24, 25, 26, 48, 449/32, 34
IPC ..................... A01K 47/00, 47/04, 47/06, 53/00
See application file for complete search history.

(56) References Cited

U.S. PATENT DOCUMENTS

| | | | |
|---|---|---|---|
| 39,622 A | 8/1863 | Andrus | |
| 134,674 A | 1/1873 | Johnson et al. | |
| 201,965 A | 4/1878 | Wash | |
| 212,047 A | 2/1879 | Parker et al. | |
| 221,284 A | 11/1879 | Connolly | |
| 408,763 A * | 8/1889 | Spradlin ................ | A01K 47/00 449/26 |
| 470,111 A * | 3/1892 | Drummond ............ | A01K 47/00 449/32 |
| 680,025 A * | 8/1901 | Decroly ................. | A01K 47/00 449/26 |
| 867,423 A | 10/1907 | Rupe | |
| 1,363,149 A | 12/1920 | Mueller | |
| 1,518,102 A | 12/1924 | Philpott | |
| 2,678,744 A | 5/1954 | Kruse | |
| 3,088,134 A * | 5/1963 | Abel ...................... | A01K 47/00 449/24 |
| 3,758,896 A | 9/1973 | Croan | |

(Continued)

FOREIGN PATENT DOCUMENTS

| | | |
|---|---|---|
| CN | 2297410 Y | 11/1998 |
| CN | 1259277 A | 7/2000 |

(Continued)

*Primary Examiner* — Lisa Tsang
(74) *Attorney, Agent, or Firm* — Luedeka Neely Group, P.C.

(57) ABSTRACT

A beehive comprises a main housing, a primary entrance housing that is rotatably attached to the main housing, and a rotation element for rotating the main housing about its rotational axis between vertical and horizontal positions. The main housing includes chambers for holding honey frames and brood frames. The primary entrance housing includes a primary entrance slot that allows ingress and egress of bees into and out of the primary entrance housing. A primary entrance tube connects the main housing to the primary entrance housing. The primary entrance tube provides a path of travel for bees to move between the primary entrance housing and the main housing. In this configuration, the bees may freely move from the exterior of the beehive, through the primary entrance slot into the primary entrance housing, and through the primary entrance tube into the chambers of the main housing.

22 Claims, 16 Drawing Sheets

(56) References Cited

U.S. PATENT DOCUMENTS

| | | | |
|---|---|---|---|
| 3,914,812 A | 10/1975 | Kent | |
| 3,999,237 A | 12/1976 | Solomon | |
| 4,094,026 A | 6/1978 | Simoni | |
| 4,135,265 A * | 1/1979 | Van de Kerkof | A01K 47/00 449/13 |
| 4,176,416 A | 12/1979 | Brittingham | |
| 4,329,749 A | 5/1982 | Hogg | |
| 4,346,490 A | 8/1982 | Katz et al. | |
| 4,349,927 A | 9/1982 | Adams, IV | |
| 4,409,697 A | 10/1983 | Bouwens | |
| 4,573,228 A | 3/1986 | Bachalo | |
| 4,639,962 A | 2/1987 | Hogg | |
| 4,682,380 A | 7/1987 | Martin | |
| 4,736,479 A | 4/1988 | Lagerman | |
| 4,981,458 A | 1/1991 | Johnston | |
| 5,035,668 A * | 7/1991 | Ungar | A01K 47/00 449/33 |
| 5,211,597 A | 5/1993 | Scott et al. | |
| 6,450,858 B1 * | 9/2002 | Schmitz | A01K 47/06 449/20 |
| 6,645,039 B2 | 11/2003 | Rovera | |
| 7,922,559 B2 | 4/2011 | Cook | |
| 2003/0162478 A1 | 8/2003 | Malacsina | |
| 2007/0060021 A1 | 3/2007 | Bigham et al. | |
| 2007/0232189 A1 | 10/2007 | Hamby | |
| 2009/0227180 A1 | 9/2009 | Papalia | |
| 2010/0022161 A1 | 1/2010 | Shtatnov | |
| 2014/0323015 A1 * | 10/2014 | Anderson | A01K 53/00 449/11 |

FOREIGN PATENT DOCUMENTS

| | | |
|---|---|---|
| CN | 1623375 A | 6/2005 |
| CN | 2746754 Y | 12/2005 |
| CN | 2888865 Y | 4/2007 |
| CN | 200969814 Y | 11/2007 |
| CN | 200973298 Y | 11/2007 |
| CN | 201107971 Y | 9/2008 |
| CN | 201199852 Y | 3/2009 |
| CN | 101455185 A | 6/2009 |
| CN | 201451036 U | 5/2010 |
| CN | 201550499 U | 8/2010 |
| CN | 201563483 U | 9/2010 |
| CN | 201577405 U | 9/2010 |
| CN | 201805801 U | 4/2011 |
| DE | 3830802 A1 | 3/1990 |
| DE | 20214128 U1 | 11/2002 |
| DE | 202004011820 U1 | 11/2004 |
| DE | 102004024901 A1 | 12/2005 |
| FR | 555188 A | 6/1923 |
| FR | 2524766 A1 | 10/1983 |
| FR | 2623373 A1 | 5/1989 |
| FR | 2758237 A1 | 7/1998 |
| GB | 005868 | 0/1901 |
| GB | 007399 | 0/1902 |
| GB | 008641 | 0/1897 |
| GB | 013320 | 0/1903 |
| GB | 013797 | 0/1910 |
| GB | 016470 | 0/1905 |
| GB | 027584 | 0/1912 |
| GB | 362369 | 11/1931 |
| GB | 426606 | 4/1935 |
| GB | 549740 | 12/1942 |
| GB | 564220 | 9/1944 |
| GB | 592090 | 9/1947 |
| GB | 597467 A | 1/1948 |
| GB | 644507 | 10/1950 |
| GB | 1182887 | 3/1970 |
| JP | 61108317 A | 5/1986 |
| JP | 9028228 A | 2/1997 |
| JP | 11225618 A | 8/1999 |
| JP | 2001340038 A | 12/2001 |
| JP | 2007143428 A | 6/2007 |
| RU | 2010510 C1 | 4/1994 |
| RU | 2048762 C1 | 11/1995 |
| RU | 2067827 C1 | 10/1996 |
| RU | 2146443 C1 | 3/2000 |
| RU | 2149539 C1 | 5/2000 |
| RU | 2153801 C1 | 8/2000 |
| RU | 2169462 C1 | 6/2001 |
| RU | 2178642 C1 | 1/2002 |
| RU | 2201671 C2 | 4/2003 |
| RU | 2218757 C1 | 12/2003 |
| RU | 2229801 C2 | 6/2004 |
| RU | 2237994 C2 | 10/2004 |
| RU | 2284103 C1 | 8/2006 |
| RU | 2311762 C2 | 12/2007 |
| RU | 75537 | 8/2008 |
| RU | 86401 | 9/2009 |
| RU | 91255 U1 | 2/2010 |
| WO | 2004071180 A2 | 8/2004 |
| WO | 2006030457 A1 | 3/2006 |
| WO | 2007022544 A1 | 2/2007 |
| WO | 2008061286 A1 | 5/2008 |
| WO | 2009117984 A1 | 10/2009 |
| WO | 2010099280 A1 | 9/2010 |
| WO | 2011094201 A1 | 8/2011 |

\* cited by examiner

Section C-C

Section A-A

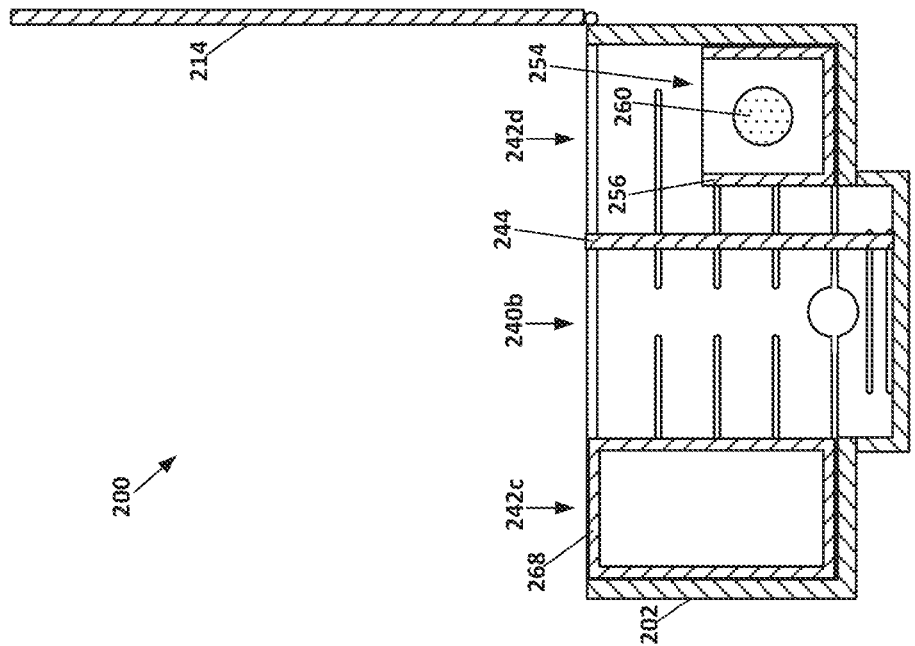
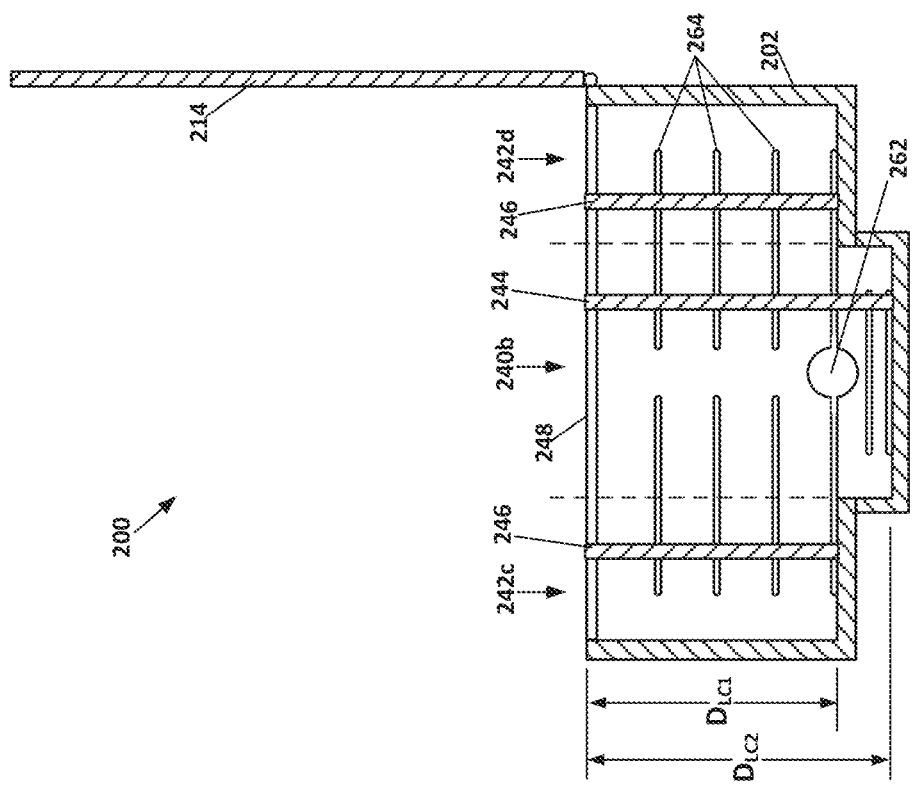

BEEHIVE SYSTEM

RELATED APPLICATIONS

This application claims priority as a continuation-in-part to U.S. application Ser. No. 13/283,977 filed Oct. 28, 2011, titled MAN-MAD BEE HOUSING APPARATUS.

FIELD

This disclosure relates to the field of domestic bee-keeping. More particularly, this disclosure relates to man-made structures for housing bees.

BACKGROUND

Domesticated bee-keeping technology has advanced substantially over the past couple of centuries, but one thing that has not changed much at all since the 1860s is housing for domesticated bees. In 1860, Lorenzo Langstroth obtained U.S. Pat. No. 9,300 on a man-made beehive design that is still primarily used today. Although many of the features of the Langstroth man-made bee housing design were revolutionary when conceived and still are used today including Langstroth frames and associated spacing, one drawback is the requirement to manually lift rectangular boxes to extract honey from a hive inside the housing. These boxes can weigh up to about 60 pounds when fully loaded with beehive structure and honey. During certain seasons, it is desirable for a bee keeper to check on the queen bee in a beehive at least about every ten days or so. Thus, lifting and moving multiple heavy boxes takes a toll on the bee keeper is simply not possible for some people, such as people with physical disabilities.

Nonetheless, the substantially vertical arrangement of the Langstroth man-made bee housing is actually the manner in which bees in nature build their hives. Thus, there is evidence in nature that bees prefer a substantially vertical orientation for their beehives.

What is needed, therefore, is a man-made bee housing that is maintained in a substantially vertical orientation but that is accessible to persons of all ages and capability levels (including, e.g., persons unable to lift a heavy box from a Langstroth device).

SUMMARY

The above and other needs are met by a beehive that includes a main housing having upper and lower chambers for holding honey frames and brood frames. The upper chamber, which has a height $H_{UC}$ and a width $W_{UC}$, includes first and second upper honey frame holding areas and an upper brood frame holding area disposed between the first and second upper honey frame holding areas. The first and second upper honey frame holding areas have a depth $D_{UC1}$ for holding honey frames and the upper brood frame holding area has a depth $D_{UC2}$ for holding brood frames. The lower chamber, which is disposed beneath the upper chamber, has a height $H_{LC}$ and a width $W_{LC}$ and includes first and second lower honey frame holding areas and a lower brood frame holding area disposed between the first and second lower honey frame holding areas. The first and second lower honey frame holding areas are disposed beneath the first and second upper honey frame holding areas, respectively, and the lower brood frame holding area is disposed beneath the upper brood frame holding area. The first and second lower honey frame holding areas have a depth $D_{LC1}$ for holding honey frames and the lower brood frame holding area has a depth $D_{LC2}$ for holding brood frames. A central divider wall is disposed between the upper chamber and the lower chamber. A central aperture passes through the central divider wall and connects the upper chamber to the lower chamber. The central aperture provides a passage for the queen bee to move freely between the upper brood frame holding area and the lower brood frame holding area.

In some embodiments, the beehive includes a roof disposed above the upper chamber.

In some embodiments, the beehive includes a frame storage area disposed beneath the roof and above the upper chamber. The frame storage area preferably has a width $W_{FH}$ that is substantially equivalent to the height $H_{UC}$ of the upper chamber and the height $H_{LC}$ of the lower chamber.

In some embodiments, the beehive includes a vent aperture that provides an air passage between the upper chamber and the frame holding area.

In some embodiments, the beehive includes a door attached to the main housing that is moveable between an open position and a closed position. The door covers the upper chamber and the lower chamber when it is in the closed position, and it provides access to the upper chamber and the lower chamber when it is in the open position.

In some embodiments, the beehive includes a spacer box having a height that is substantially equivalent to the height $H_{UC}$ of the upper chamber or the height $H_{LC}$ of the lower chamber and a depth that is substantially equivalent to the depth of the honey frame holding areas. The spacer box is configured to occupy space within any of the honey frame holding areas during times when no honey frames are to be disposed in the honey frame holding areas.

In some embodiments, the beehive includes an inside feeder housing configured to hold one or more bee feeder containers within any of the holding areas during times when no honey frames occupy those areas.

In some embodiments, the beehive includes a secondary entrance slot disposed adjacent a lowermost surface of the lower chamber. The secondary entrance slot extends through the main housing and provides for ingress and egress of bees from the main housing of the beehive.

In some embodiments, the beehive is configured to rotate on a rotational axis disposed parallel and coincident with the central divider wall of the main housing. These embodiments include means for rotating the main housing of the beehive about the rotational axis from a substantially vertical position in which the upper chamber is disposed vertically above the lower chamber to a substantially horizontal position in which the upper and lower chambers are disposed horizontally side-by-side.

In some embodiments, the beehive includes a primary entrance housing that is rotatably attached to the main housing adjacent the main housing entrance aperture. The primary entrance housing is operable to rotate with respect to the main housing as the main housing rotates from the vertical position to the horizontal position with respect to the ground surface. The primary entrance housing includes a primary entrance slot disposed adjacent a lowermost surface of the primary entrance housing. The primary entrance slot, which extends through the primary entrance housing from the exterior to the interior of the primary entrance housing, provides for ingress and egress of bees to and from the exterior to the interior of the primary entrance housing. A primary entrance aperture is also provided that extends through the primary entrance housing from the exterior to the interior of the primary entrance housing. A primary entrance tube connects a main housing entrance aperture in the main housing to the primary entrance aperture of the primary entrance housing. The primary entrance tube provides a path of travel for bees to move between the primary entrance housing and the main housing. In this configuration, bees may freely move from the exterior of the beehive, through the primary entrance slot into the interior of the primary entrance housing, and through the primary entrance aperture, the primary entrance tube, and the main housing entrance aperture to pass into the upper or lower chambers of the main housing.

In some embodiments of the beehive, the primary entrance tube is rigidly affixed to the main housing and the primary entrance housing is rotatably attached to the primary entrance tube.

In some embodiments, the primary entrance tube is circular and has an outer diameter, and the primary entrance aperture is circular and has an inner diameter, wherein the outer diameter of the primary entrance tube is less than the inner diameter of the primary entrance aperture. In these embodiments, the primary entrance tube passes through the primary entrance aperture, and the primary entrance tube is free to rotate within the primary entrance aperture as the main housing rotates between the vertical position and the horizontal position.

In some embodiments, the main housing entrance aperture, the primary entrance aperture, and the primary entrance tube are all aligned with the rotational axis of the beehive.

In some embodiments, the main housing entrance aperture straddles the central divider wall, thereby providing openings into the upper chamber and the lower chamber of the main housing.

In some embodiments, one or both of the upper and lower chambers of the main housing are configured to receive honey frames and brood frames having a frame length dimension $L_F$ and a frame height dimension $H_F$, where the frame length dimension $L_F$ is greater than the frame height dimension $H_F$. When the main housing is in the vertical position, the honey frames and brood frames are so disposed that their frame length dimension $L_F$ is disposed vertically and their frame height dimension $H_F$ is disposed horizontally. When the main housing is in the horizontal position, the honey frames and brood frames are so disposed that their frame length dimension $L_F$ is disposed horizontally and their frame height dimension $H_F$ is disposed vertically.

One preferred embodiment of the beehive comprises a main housing, a primary entrance housing that is rotatably attached to the main housing, and means for rotating the main housing about its rotational axis from a vertical position to a horizontal position with respect to the ground surface. The main housing includes one or more chambers for holding honey frames and brood frames. A main housing entrance aperture extends through an outer wall of the main housing from its exterior into the one or more chambers. The primary entrance housing is rotatably attached to the main housing adjacent the main housing entrance aperture. The primary entrance housing is operable to rotate with respect to the main housing as the main housing rotates about its rotational axis from the vertical position to the horizontal position. The primary entrance housing includes a primary entrance slot that extends through the primary entrance housing from its exterior to its interior. The primary entrance slot provides for ingress and egress of bees to and from the exterior to the interior of the primary entrance housing. A primary entrance aperture also extends through the primary entrance housing from its exterior to its interior. A primary entrance tube connects the main housing entrance aperture of the main housing to the primary entrance aperture of the primary entrance housing. The primary entrance tube provides a path of travel for bees to move between the primary entrance housing and the main housing. In this configuration, the bees may freely move from the exterior of the beehive, through the primary entrance slot into the interior of the primary entrance housing, and through the primary entrance aperture, the primary entrance tube, and the main housing entrance aperture to pass into the one or more chambers of the main housing.

In some embodiments, the primary entrance housing has a roof portion that substantially covers an upper portion of the primary entrance housing.

In some embodiments, the primary entrance housing includes a feeder aperture disposed beneath the roof portion. The feeder aperture is configured to receive a bee feeder container. The roof portion is configured to be movable relative to the primary entrance housing or removable from the primary entrance housing to accommodate insertion of the bee feeder container into the feeder aperture. In some embodiments, the roof portion is hinged to the primary entrance housing.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 14A-14C depict a preferred embodiment of a beehive in a vertical orientation with its access door open.

DETAILED DESCRIPTION

Various terms used herein are intended to have particular meanings Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Substantially vertical orientation: a position wherein a lengthwise orientation of an object is aligned with the directional force of Earth's gravity within +/−25°, or generally perpendicular to a flat ground surface.

Substantially horizontal orientation: a position wherein a lengthwise orientation of an object is positioned orthogonal to the directional force of Earth's gravity within +/−25°, or generally parallel to a flat ground surface.

Figure 1:
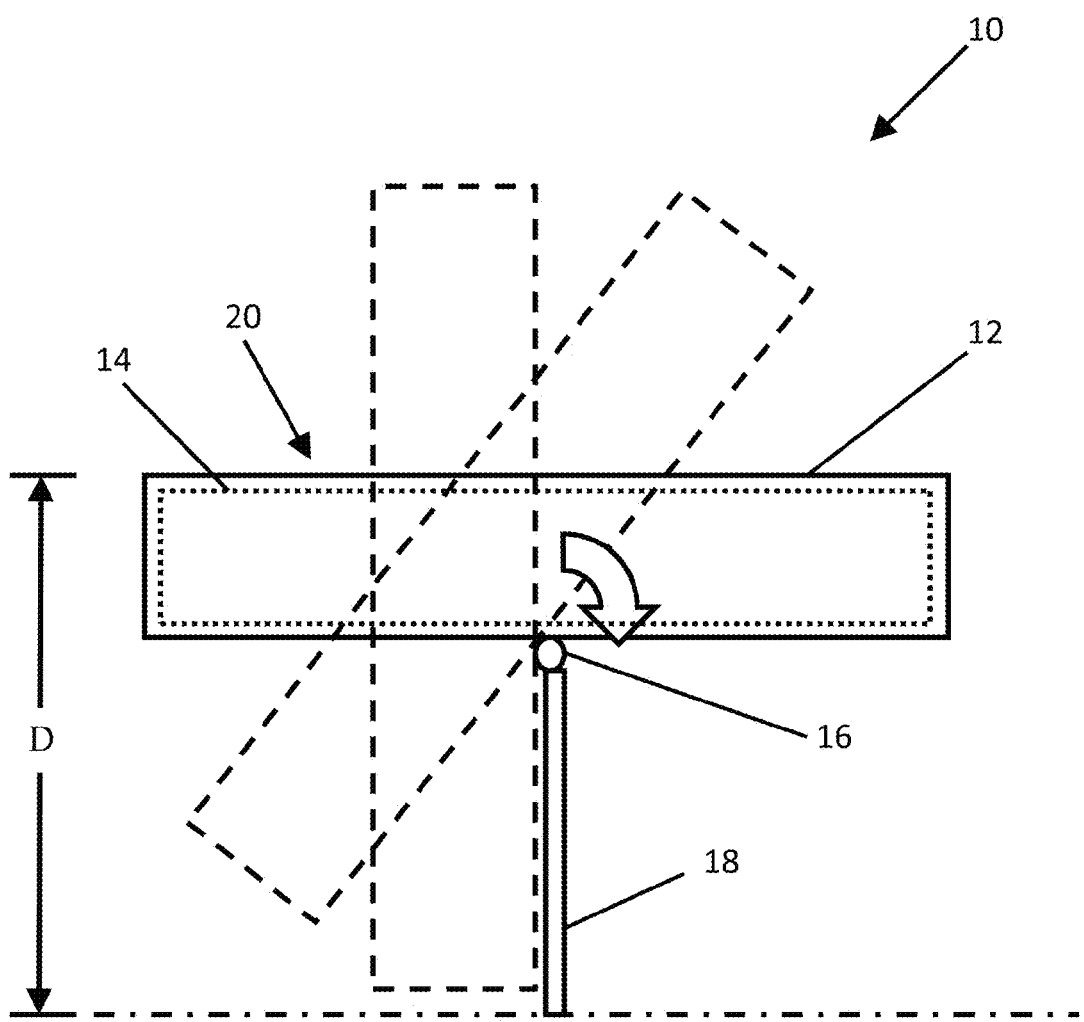
FIG. 1 shows a schematic representation of a man-made bee housing as described herein.

FIG. 1 shows a schematic view of features of a man-made bee housing 10 including a primary enclosure 12 defining a primary compartment 14, a rotation element 16, and a support structure 18. The top 20 of the primary enclosure (when in a substantially horizontal orientation) is preferably a distance D of from about 2 feet (ft) to about 5 ft and more preferably from about 3 ft to about 4 ft from the local ground level for easy access to the primary compartment.

Figure 2:
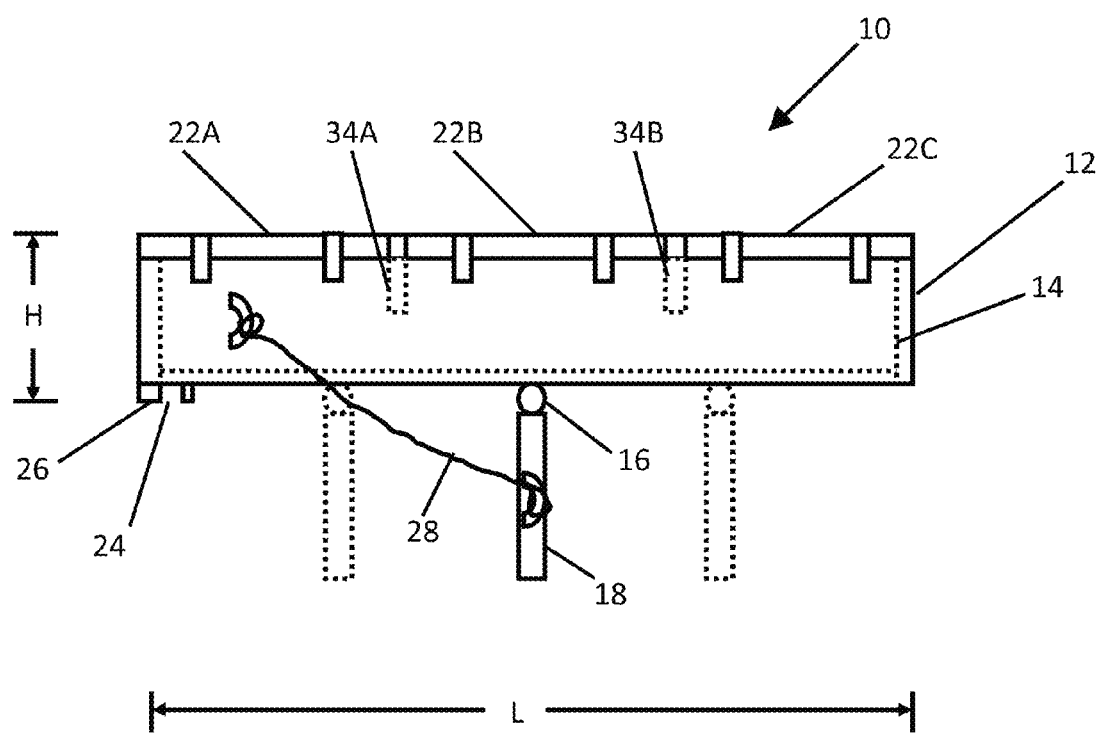
FIG. 2 shows a schematic side view of a man-made bee housing as described herein.
Figure 3:
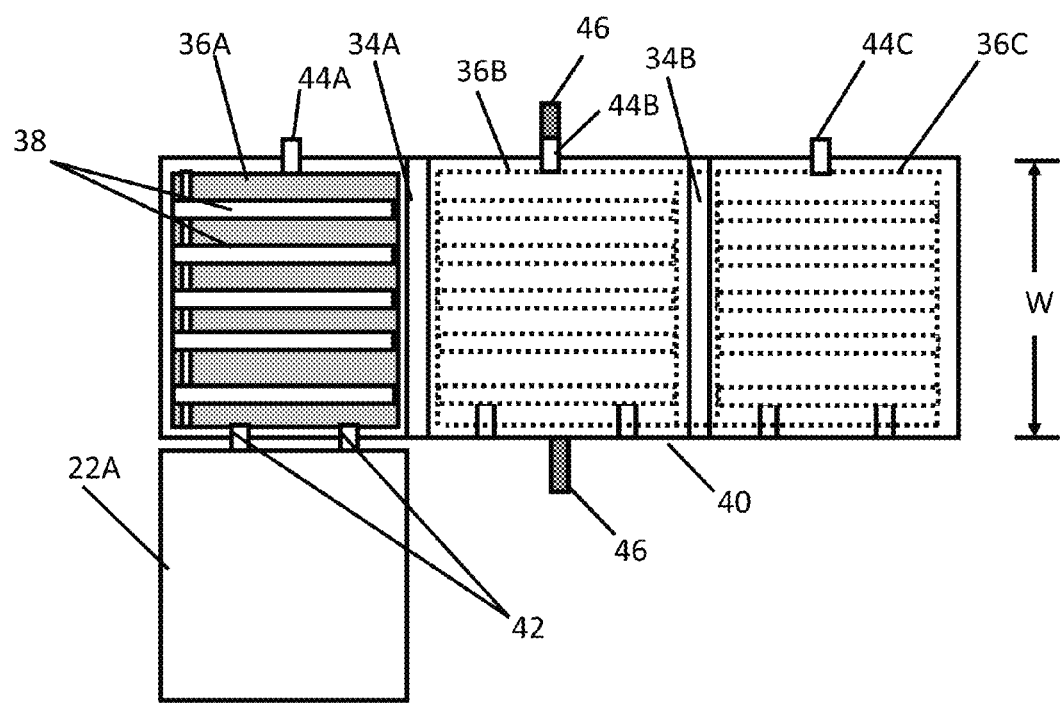
FIG. 3 shows a schematic plan view of a man-made bee housing as described herein.

FIGS. 2-3 show somewhat schematic views of the man-made bee housing 10 wherein the primary enclosure 12 further includes a plurality of doors 22 (22A, 22B, and 22C), each of the doors 22 for providing access to the primary compartment 14. The primary compartment 14 includes an entrance aperture 24 through which the bees of a colony can enter and exit the beehive. Preferably, a landing board 26 is included adjacent the entrance aperture 24 for bees to land on and take off from. A catch member 28 is shown which is used to provide supplemental support for the primary enclosure 12 when the primary enclosure 12 is in a substantially horizontal orientation. The catch member 28, if necessary, can come in a variety of forms including a cable, chain, or other ropelike apparatus limiting the rotation of the primary enclosure 12 as shown in FIG. 2, or, for example, a beam 32 as shown in FIG. 4B offering direct support beneath the primary enclosure 12. Where other external objects of appropriate height are proximate the man-made bee housing 10, such external objects can be used such as, for example, an embankment, a rock, a wall, a table, a bench, and the like. Thus, a catch member 28 is not necessarily a part of every embodiment of the disclosure as there are a variety of external items that can be used for supplemental support of the primary enclosure 12. The man-made bee housing 10 in FIG. 2 also includes a plurality of partial barriers 34 (34A and 34B) for separating a plurality of sub-compartments 36 (36A, 36B, and 36C). The plurality of doors 22 preferably correspond in shape and size to the plurality of sub-compartments 36, respectively. FIG. 2 also shows phantom schematic indicators of the rotation element 16 and the support structure 18 to illustrate that the attachment of the rotation element 16 to the primary enclosure can vary from embodiment to embodiment, most often depending of the type of mechanism used as or with the rotation element 16.

FIG. 3 shows a plurality of frames 38 removably attached to the primary enclosure 12 within the first sub-compartment 34A. FIG. 3 also shows an example of how the plurality of doors 22 can be attached to a side panel 40 of the primary enclosure 12 using a pair of hinges 42. A plurality of latches 44 (44A, 44B, and 44C) is also shown, one hinge connected to each of the doors 22 for latching and, if desired, locking the doors 22 to thereby lock the primary enclosure 12. Although hinges and latches are shown in FIG. 3, other fasteners known to a person having ordinary skill in the art for connecting the plurality of doors 22 to other portion(s) of the primary enclosure 12 are contemplated. FIG. 3 also shows the rotation element 16 in the form of a pair of extension members 46 extending outwardly from opposed sides of the primary enclosure 12.

Figure 4A:
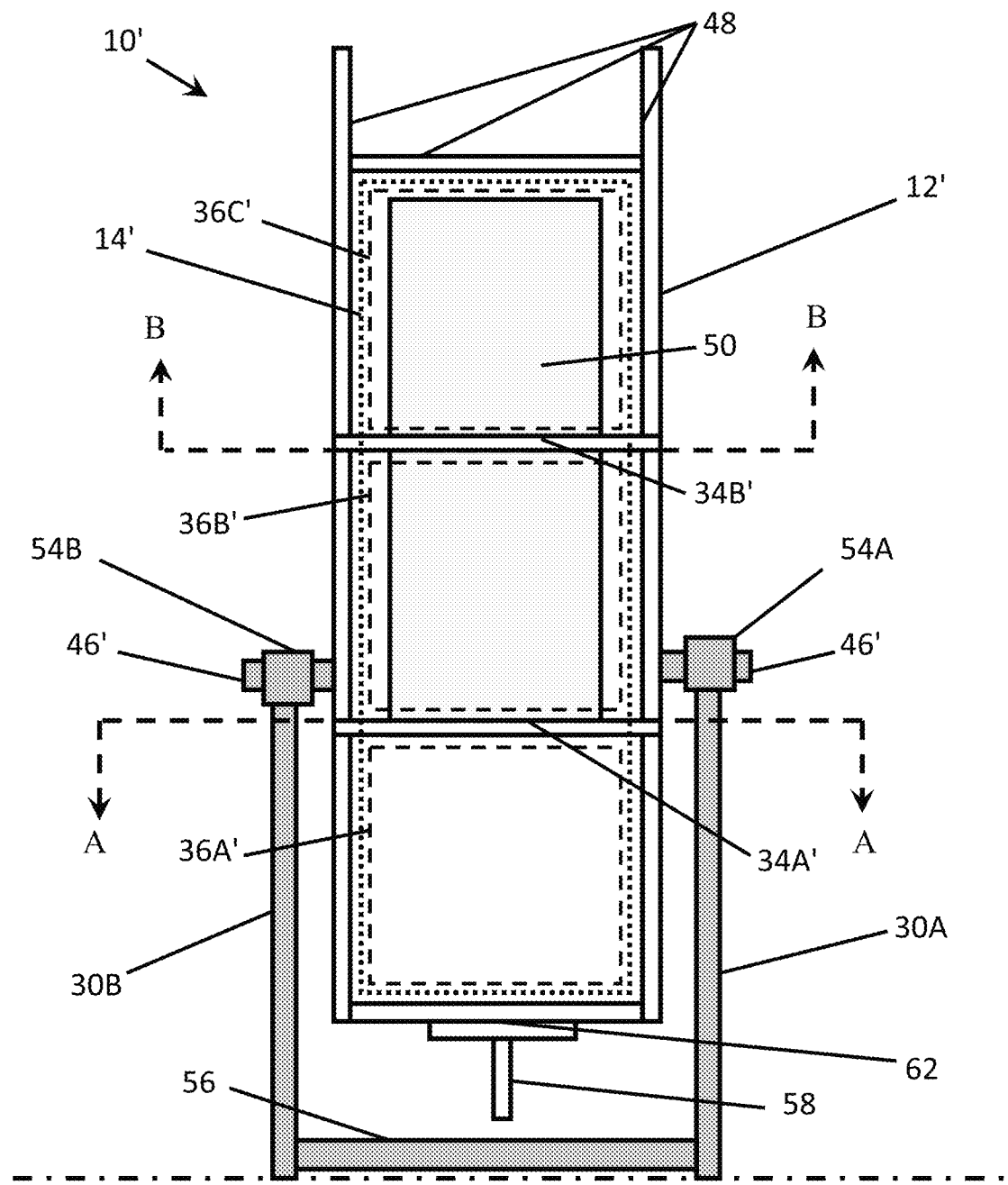
FIG. 4A shows a schematic end view of a man-made bee housing as described herein wherein a primary enclosure has been rotated to a substantially vertical orientation.
Figure 4B:
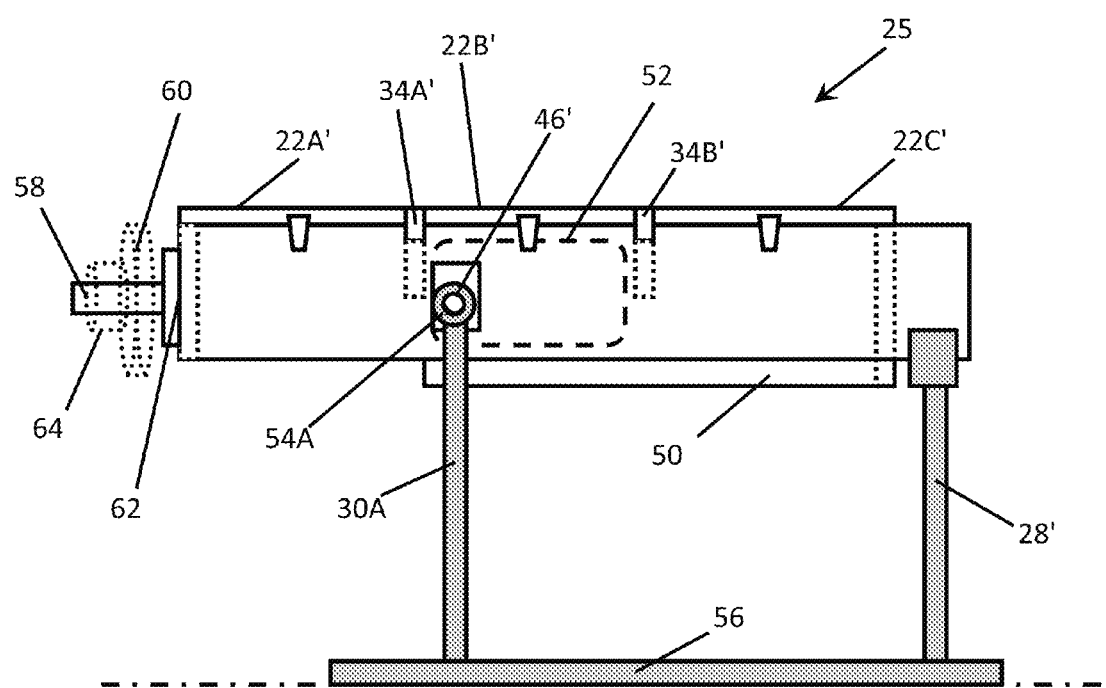
FIG. 4B shows a schematic side view of a man-made bee housing as described herein wherein the primary enclosure of FIG. 4A has been rotated to a substantially horizontal orientation.
Figure 4C:
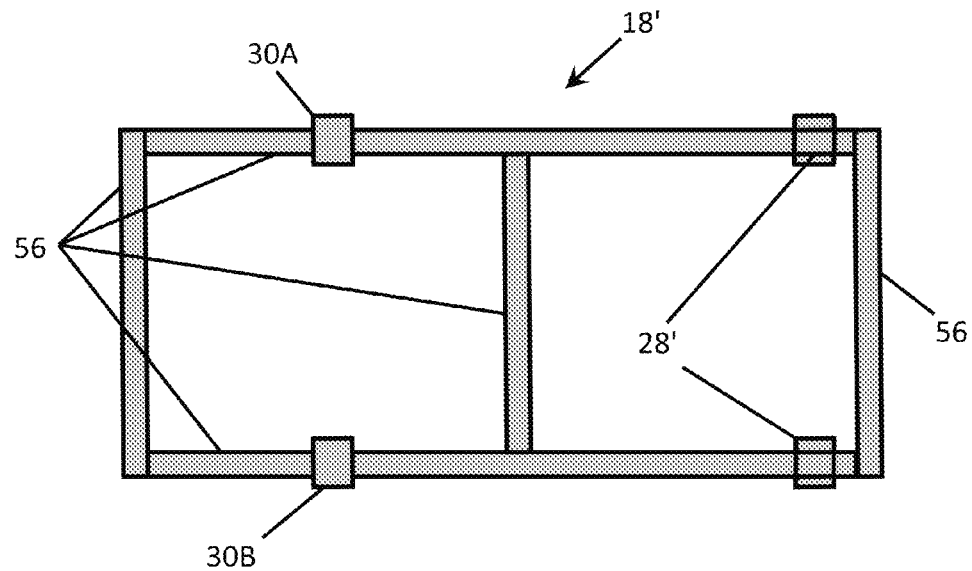
FIG. 4C shows a schematic plan view of a support structure excluding the primary enclosure of FIGS. 4A-4B.
Figure 4D:
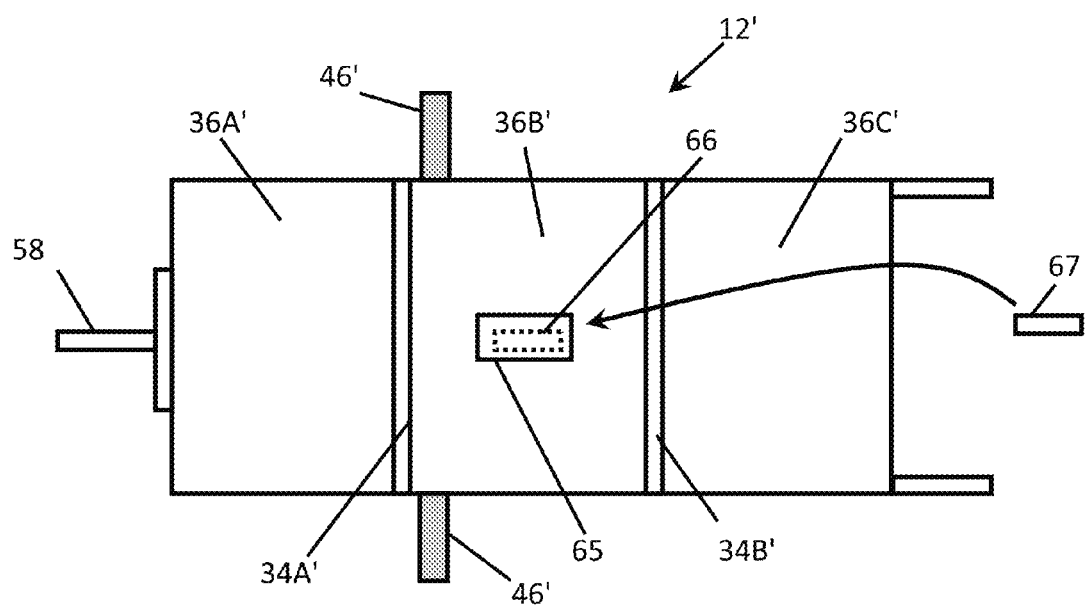
FIG. 4D shows a schematic plan view of the primary enclosure of FIGS. 4A-4B.
Figure 5A:
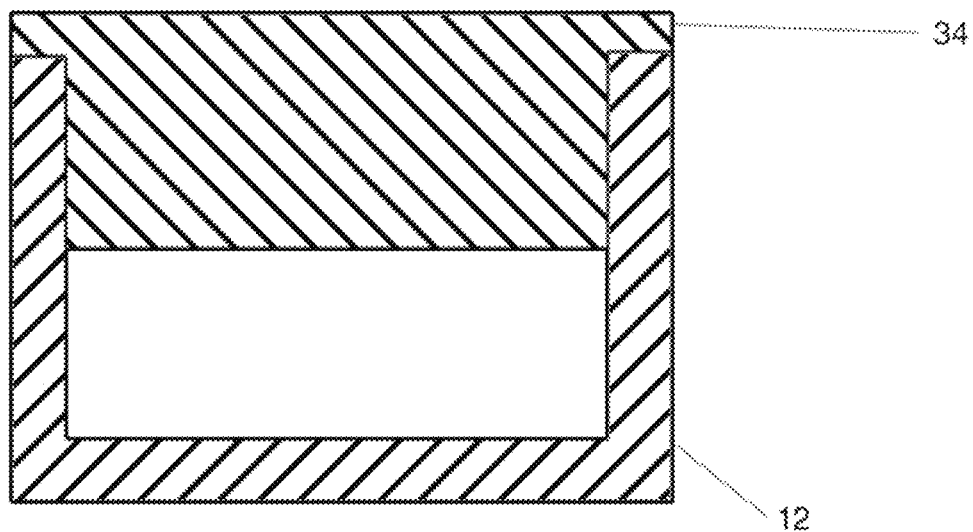
FIG. 5A shows a somewhat schematic cross-sectional view of the primary enclosure of FIGS. 4A, 4B, and 4C as cut across line A-A in FIG. 4A.
Figure 5B:
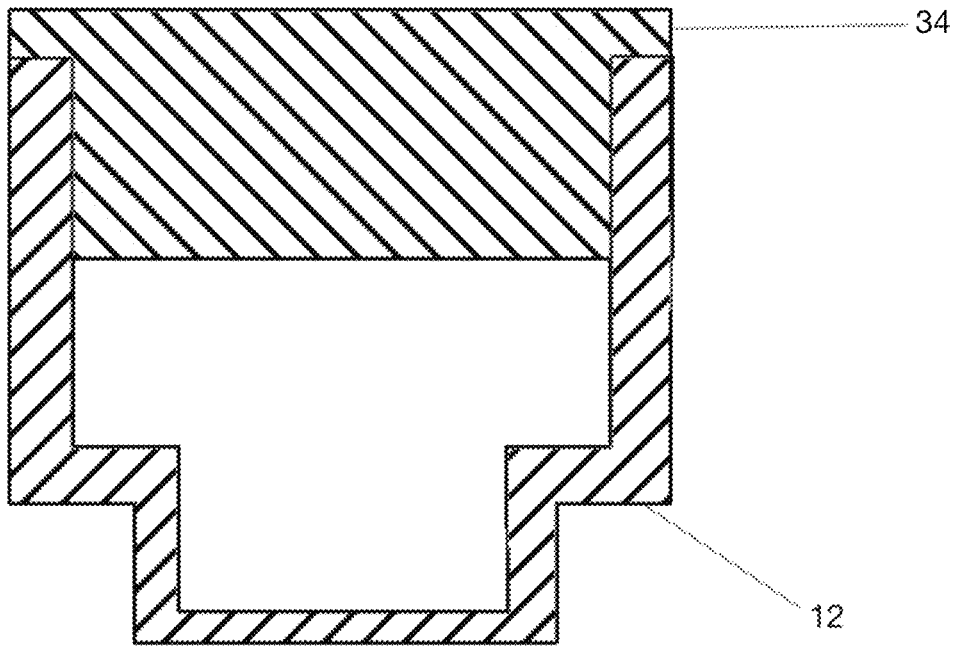
FIG. 5B shows a somewhat schematic cross-sectional view of the primary enclosure of FIGS. 4A, 4B, and 4C as cut across line B-B in FIG. 4A.

FIGS. 4A-4D show a somewhat schematic view of a man-made bee housing 10' including a primary enclosure 12' including a plurality of walls 48 and a plurality of doors 22' (22A', 22B', and 22C') defining a primary compartment 14'. The primary compartment 14' includes a plurality of sub-compartments 36' (36A', 36B', and 36C') separated by a plurality of partial barriers 34' (34A' and 34B'). FIG. 5A shows a cross-sectional view cut along line A-A in FIG. 4A and FIG. 5B shows a second cross-sectional view cut along line B-B in FIG. 4A. The respective volumes of the second sub-compartment 36B' and the third sub-compartment 36C' are preferably greater than the volume of the first sub-compartment 36A' due at least in part to the increased depth of the second sub-compartment 36B' and the third sub-compartment 36C' as shown by the shaded region 50 in FIGS. 4A and 5B. Preferably, a brood chamber 52 for a bee colony is located in the second sub-compartment 36B'. FIG. 4B shows a support structure 18' including a catch member 28' in the form of a supplemental stand and a pair of upright beams 30 (30A AND 30B), each beam including an aperture (54A and 54B) for receiving and engaging with a pair of extension members 46' extending outwardly from opposed sides of the primary enclosure 12'. The support structure 18' further includes a base frame 56 as shown in FIG. 4C that provides balance and stability for the overall structure of the man-made bee housing 10'. FIG. 4D shows a plan view of the man-made bee housing 10' including the pair of extension members 46' extending outwardly from opposed sides of the primary enclosure 12' and a weight extension 58 for holding a weight 60 (e.g., conventional barbell weights or the like) to help hold a first end 62 of the primary enclosure 12' down when the primary enclosure is oriented in a substantially vertical orientation. A holder 64 (e.g., a barbell collar, a spring clip, or the like) can be used to hold the weight 60 along the weight extension 58.

FIGS. 4A and 4D show a cap 65 blocking an insertion aperture 66 preferably located through the second door 22B'. During times when it is necessary to insert a queen bee into the man-made bee housing 10', the cap 65 can be moved, revealing the insertion aperture 66. A cage 67 including a queen bee can then be inserted into the insertion aperture 66 to introduce the queen bee to the colony dwelling inside the man-made bee housing 10'. After the queen bee has exited the cage 67 and entered the primary compartment 14', the cage 67 can be removed and the cap 65 moved back to obstruct the insertion aperture. As is known in the art, this transfer process can take a number of hours and preferably one or more days so that the bees in a colony become accustomed to the scent of their new queen before having direct contact with the queen. The cap 65 can act in the form of a plug, a door, or any other similar useful object that could be utilized to obstruct and block the insertion aperture 66.

Figure 6A:
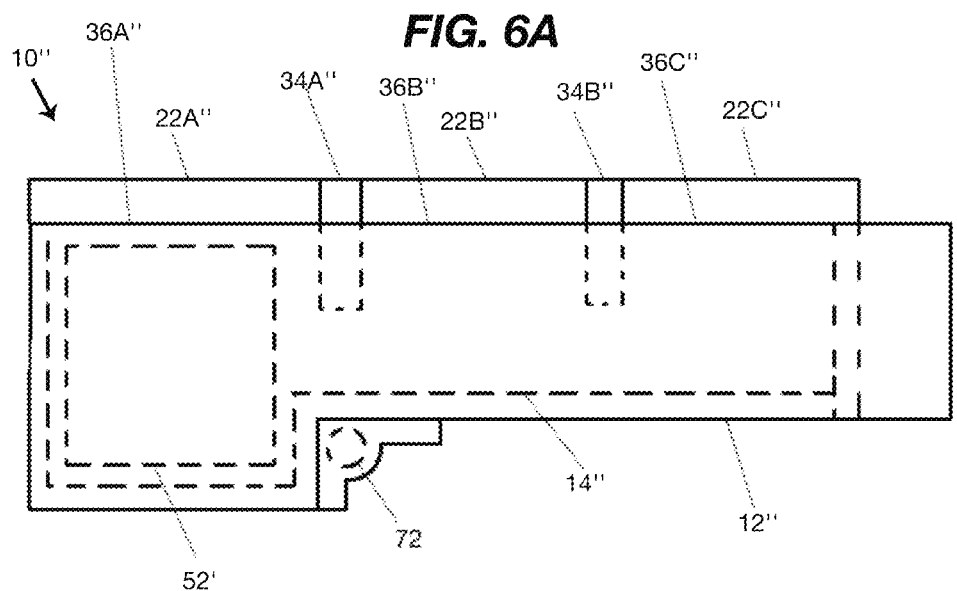
FIG. 6A shows a schematic side view of an example of a primary enclosure.
Figure 6B:
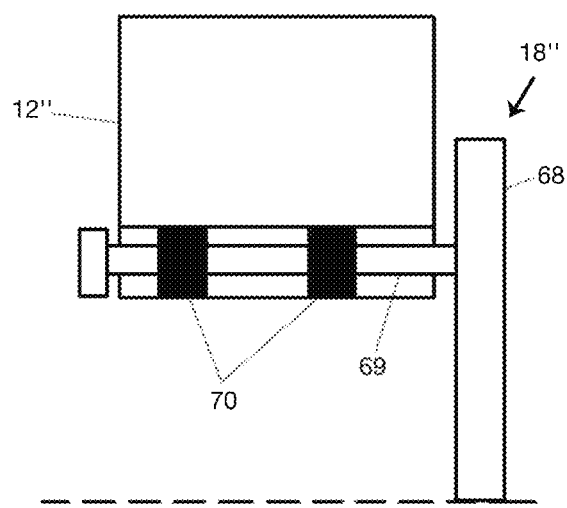
FIG. 6B shows a schematic end view of a man-made bee housing including the primary housing of FIG. 6A and including a support structure.
Figure 6C:
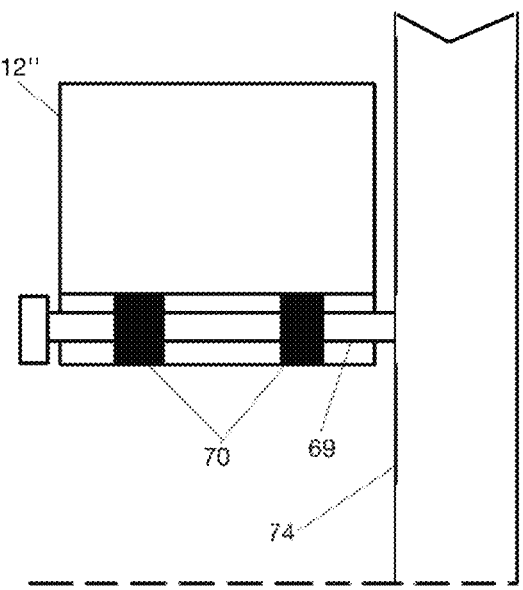
FIG. 6C shows a schematic end view of a man-made bee housing including the primary housing of FIG. 6A and including an alternate support structure.

FIGS. 6A-6C show somewhat schematic views of man-made bee housing 10" including a primary enclosure 12" and a plurality of doors 22" (22A", 22B", and 22C") defining a primary compartment 14". The primary compartment 14" includes a plurality of sub-compartments 36" (36A", 36B", and 36C") separated by a plurality of partial barriers 34" (34A" and 34B"). FIG. 6B shows a support structure 18" including a trunk member 68 and an arm member 69 that extends substantially orthogonal from the trunk member 68. A rotation member 16" is shown including a one or more connectors 70 (e.g., collar bearing, clamp, sleeve, and the like) connected to the primary enclosure 12" defining one or more coupling apertures 72 through which the arm member 69 extends. The primary enclosure 12" is rotatable about the arm member 69. FIG. 6C shows another example in which the arm member 69 extends directly from fixed body 74 (e.g., a wall, an embankment, or other structure pre-dating the man-made bee housing 10". In the scheme presented in FIGS. 6A-6C, a first sub-compartment 36A" has a volume that is greater than the volume of a second sub-compartment 36B" or the third sub-compartment 36C". The distinction in volume is based on an increased depth of the first sub-compartment 36A" where a brooding chamber 52' is preferably located.

Figure 7:
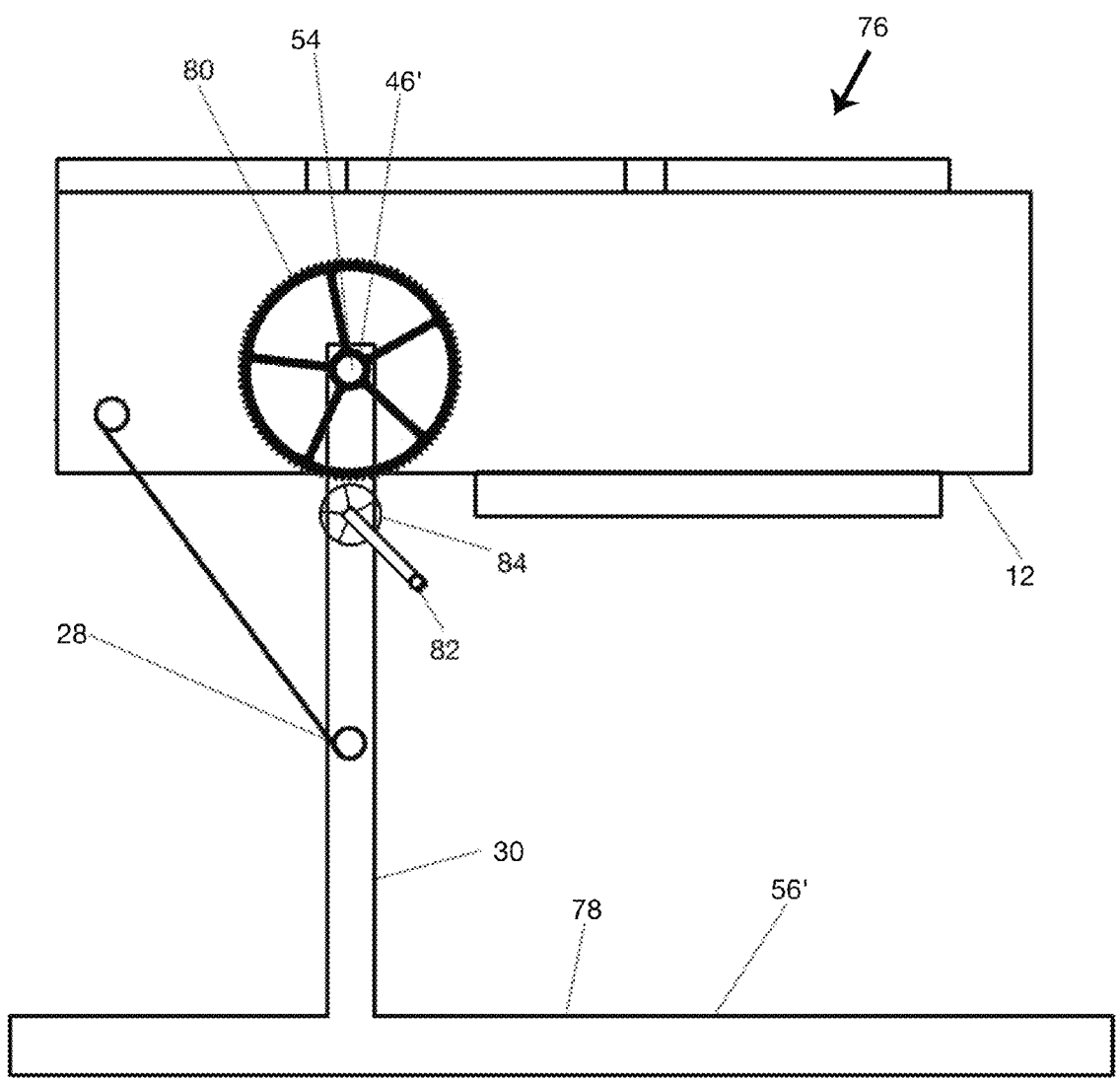
FIG. 7 shows a schematic side view of a man-made bee housing including a gear assembly.

FIG. 7 shows a schematic view of a man-made bee housing 76 including the primary enclosure 12' of FIGS. 4-5 but wherein the primary enclosure 12' is connected to an alternate support structure 78 including the catch member 28 and a pair of upright beams 30 (30A AND 30B), each beam including an aperture (54A and 54B) for receiving and engaging with a pair of extension members 46' extending outwardly from opposed sides of the primary enclosure 12'. The alternate support structure 78 further includes a base frame 56' that provides balance and stability for the overall structure of the man-made bee housing 76. The man-made bee housing 76 further includes a gear assembly 80 including a hand crank 82 and associated gears 84 for providing mechanical advantage to a user to more easily rotate the primary enclosure 12 about an imaginary axis defined substantially along the pair of extension members 46'.

Figure 8A:
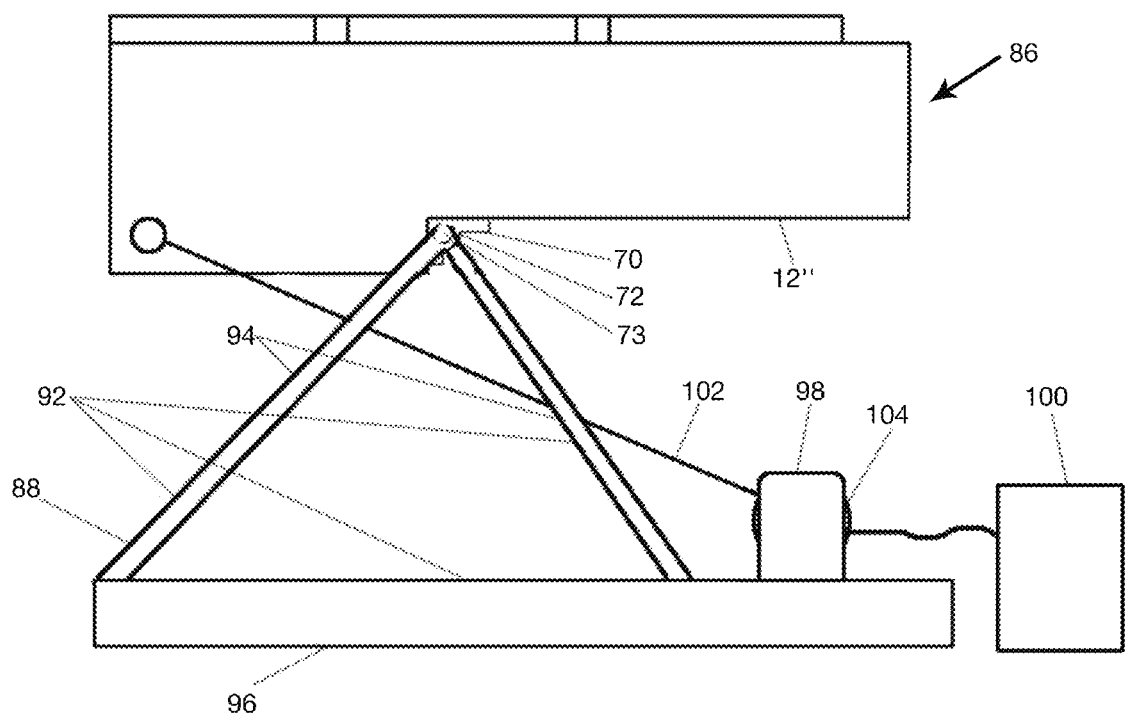
FIG. 8A shows a schematic side view of a man-made bee housing including a motor for driving a spool of cord.
Figure 8B:
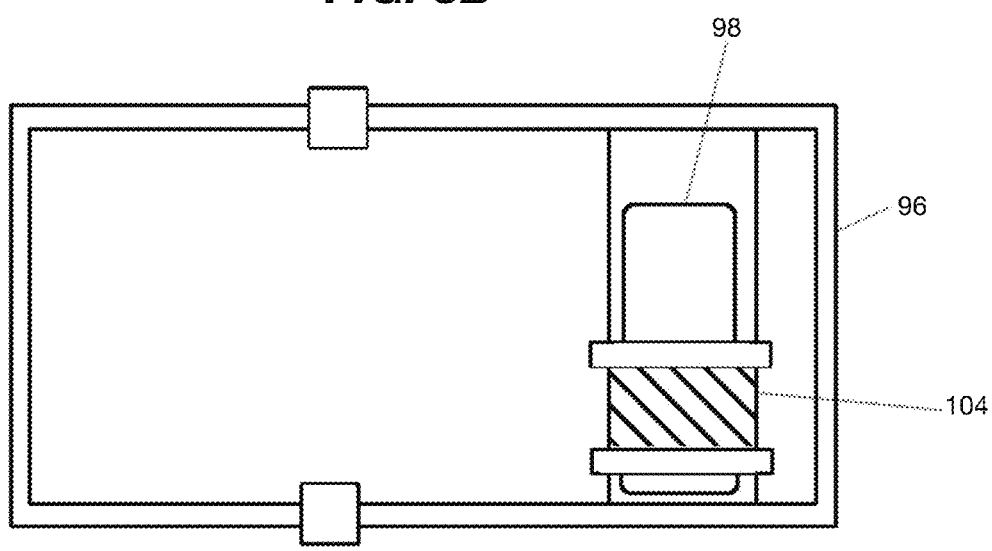
FIG. 8B shows a schematic plan view of a support structure used to hold a primary enclosure for the man-made bee housing shown in FIG. 8A.

FIGS. 8A-8B show somewhat schematic views of a man-made bee housing 86 including the primary enclosure 12" connected to an alternate support structure 88. The alternate support structure 88 includes a frame 90 including a plurality of beams 92 which further include side beams 94 and base beams 96. The rotation member 16" is shown including a one or more connectors 70 (e.g., collar bearing, clamp, sleeve, and the like) connected to the primary enclosure 12" defining one or more coupling apertures 72 through which a shaft 73 extends. A motor 98 receiving power from a power source 100 is engaged with the primary enclosure 12" via a cord 102 and associated winding assembly 104. The motor 98 can be used to wind the cord 102 about the winding assembly 104 to rotate the primary enclosure 12" to a substantially vertical orientation or lower the primary enclosure 12" to a substantially horizontal orientation. Other related schemes are contemplated wherein the motor 98 is used, for example, to engage a gear assembly (e.g., the gear assembly 80 shown in FIG. 7), thereby rotating the primary enclosure 12" directly at or proximate the shaft 73.

Figure 9:
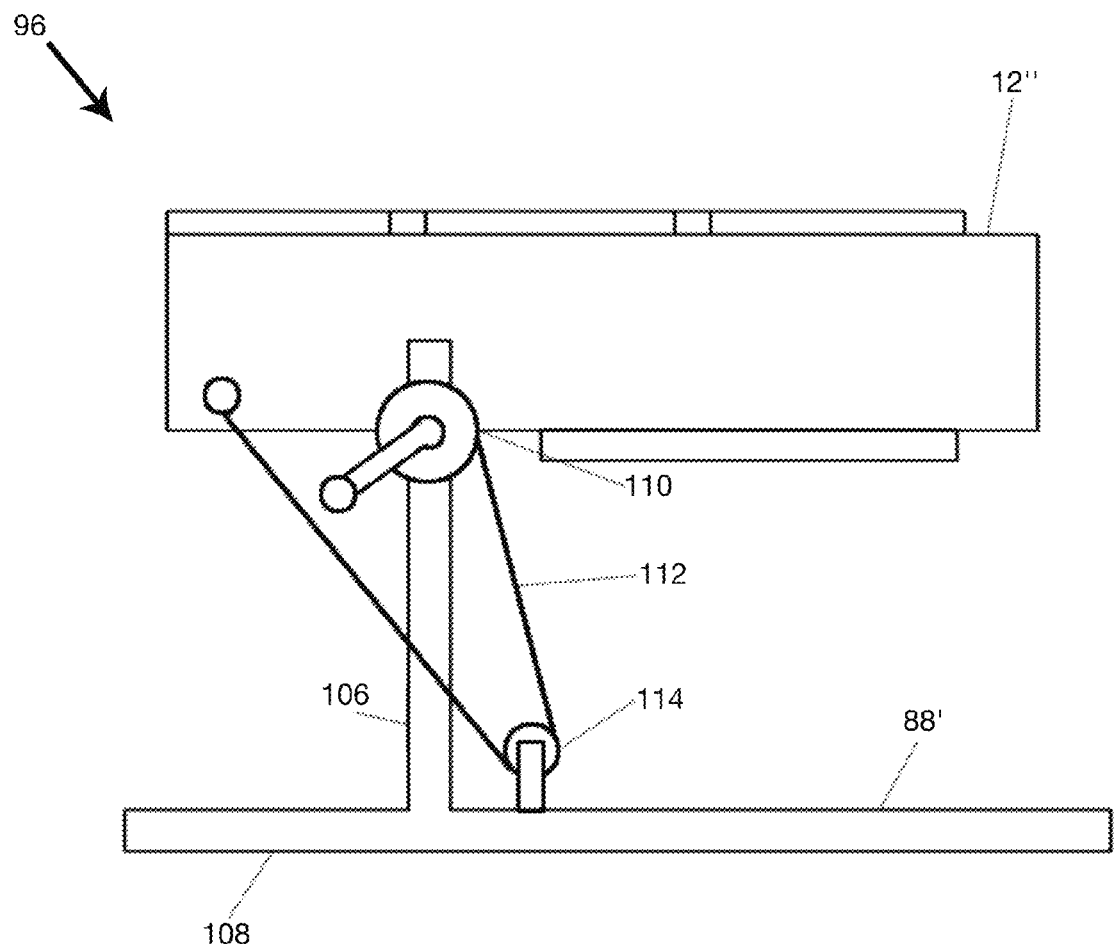
FIG. 9 shows a schematic side view of a man-made bee housing including a pulley system for rotating a primary enclosure of the man-made bee system.

FIG. 9 shows a somewhat schematic view of a man-made bee housing 96 including the primary enclosure 12" connected to an alternate support structure 88' including a pair of upright beams 106 attached to a base frame 108 for pivotally supporting the primary enclosure 12". A hand crank 110 is engaged with the primary enclosure 12" via a cord 112 and associated pulley 114. The hand crank 110 can be used to wind the cord 112 to rotate the primary enclosure 12" to a substantially vertical orientation or lower the primary enclosure 12" to a substantially horizontal orientation. The pulley 114 is preferably connected to one of the upright beams 106 and configured to provide a mechanical advantage to a user using the hand crank 110 when positioning the primary enclosure 12" in either a substantially vertical or substantially horizontal orientation. However, the pulley 114 can additionally be connected to the base frame 108, primary enclosure 12", or any other suitable position to provide a mechanical advantage.

For the various schematic examples given herein, the length "L" of the primary enclosure preferably ranges from about 48 inches to about 96 inches and more preferably from about 60 inches to about 84 inches, and most preferably from about 65 inches to about 75 inches. The width "W" of the primary enclosure preferably ranges from about 15 inches to about 36 inches and more preferably from about 20 inches to about 30 inches, and most preferably from about 23 inches to about 26 inches. The height "H" of the primary enclosure preferably ranges from about 6 inches to about 24 inches and more preferably from about 9 inches to about 16 inches, and most preferably from about 10 inches to about 14 inches. The primary compartment and sub-compartments are preferably sized so that common frames used in conventional beehives can be used in the man-made bee housings described herein. The primary enclosure is preferably made of wood, but other materials of construction are contemplated including, without limitation, plastics and other polymer-based materials. Although many of the support structures described herein include above-ground frames, other examples are contemplated in which support structures extend into and/or are anchored into the surrounding ground. Such anchoring can include, for example, cement or other stabilizing/anchoring material(s). Also, many of the support structures and rotation elements described herein are preferably made of metal or one or more metal alloys. Alternatively or additionally, such support structures and rotation elements can be made composite materials, wood, polymers, and other materials.

FIGS. 10A-10D, 11A-11B, 12, 13 and 14A-14C depict an alternative preferred embodiment of a rotatable beehive 200. This embodiment includes a main housing 202 and a primary entrance housing 206. The primary entrance housing 206 provides a year-round primary entrance/exit for bees 201 occupying the beehive 200. As described in more detail below, the primary entrance housing 206 is rotatably coupled to the main housing 202 so that as the main housing 202 rotates about its rotational axis 230 from a vertical position (FIGS. 10A-10D) to a horizontal position (FIG. 13), the primary entrance housing 206 maintains a substantially vertical orientation. This provides for minimal disturbance of the bees' entry/exit routine when the beehive is rotated to the horizontal position for inspection and maintenance.

Figure 10A:
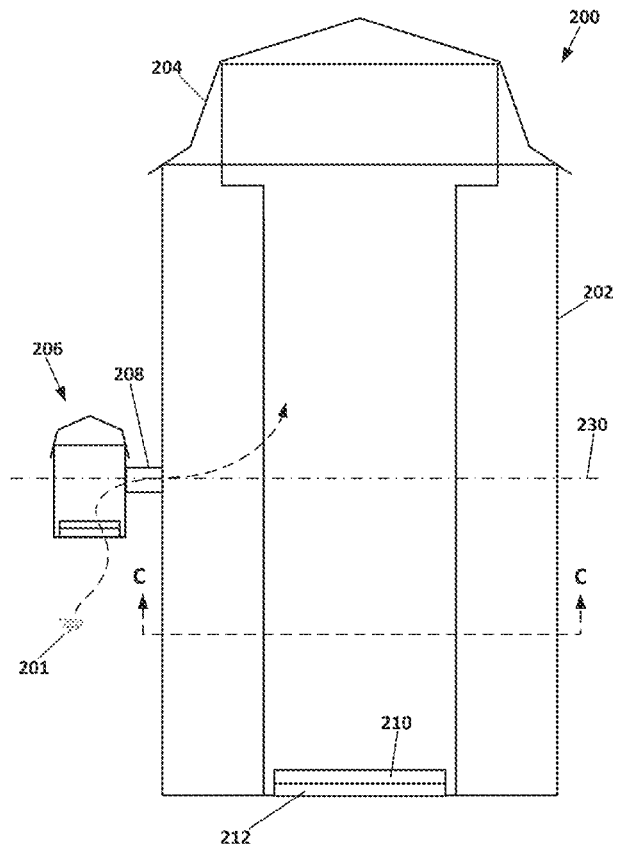
FIGS. 10A-10D depict a preferred embodiment of a beehive in a vertical orientation with its access door closed.
Figure 10B:
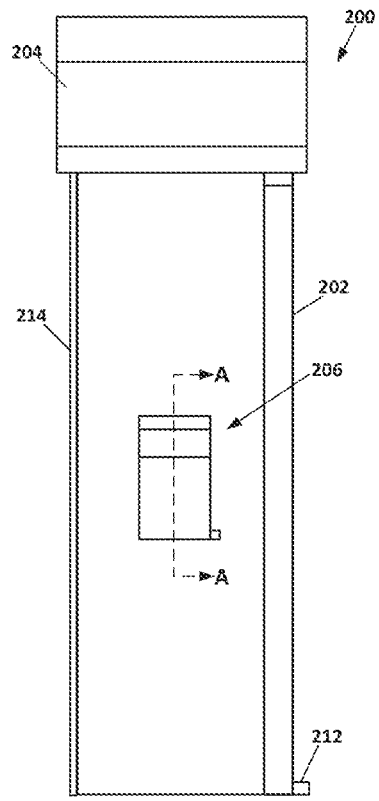
Figure 10C:
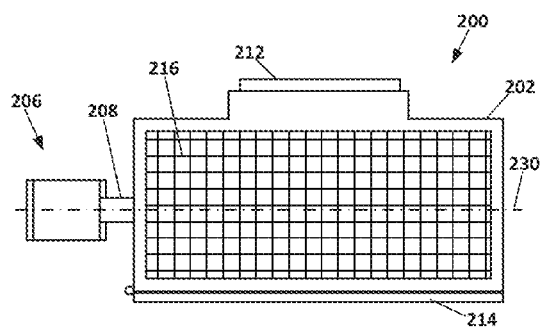
Figure 10D:
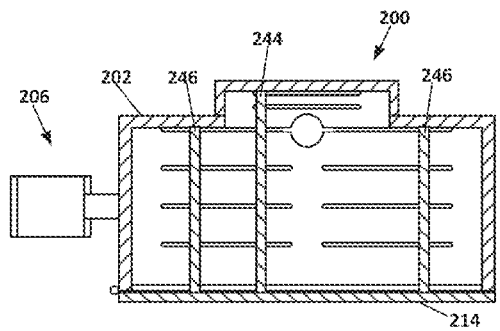
Figure 12:
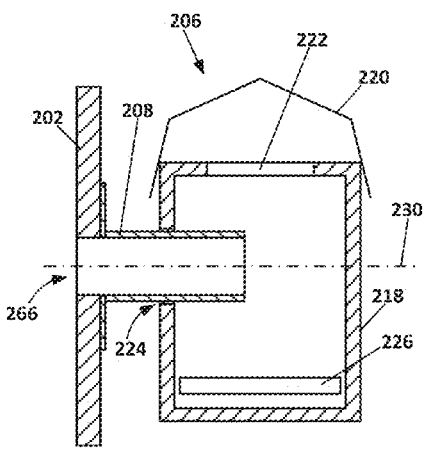

As shown in FIGS. 10A-10B, when in the vertical position, the main housing 202 is covered by a roof 204, which is preferably formed from sheet aluminum. An entrance 210 is provided on the front side of the main housing 202 to allow bees to enter and exit a lower chamber of the main housing 202. This entrance 210 is also referred to herein as secondary entrance 210. A landing board 212 is provided adjacent the secondary entrance 210. As shown in FIG. 10C, the bottom surface of the main housing 202 includes a bottom vent 216 to allow air flow through the bottom of the beehive 200. The vent 216 is preferably constructed from wire mesh.

In a preferred embodiment, the primary entrance housing 206 is rotatably coupled to a sidewall of the main housing 202 by way of a primary entrance tube 208. As shown in the cross-section view of FIG. 11, the primary entrance tube 208 is preferably secured to a plate that is secured to the main housing 202. In one embodiment, the primary entrance tube 208 is a cylindrical section of hollow steel pipe welded to a steel plate that is secured to the sidewall of the main housing 202. One of ordinary skill in the art will appreciate that the primary entrance tube 208 could alternatively be a section of PVC pipe or other plastic pipe that is secured to a PVC plate or other coupling structure. The primary entrance tube 208 is preferably aligned with a hole 266 in the sidewall of the main housing 202. This hole is also referred to herein as the main housing entrance aperture 266. In the most preferred embodiment depicted in FIG. 11, the longitudinal axis of the primary entrance tube 208 and the center of the hole 266 are aligned with the rotational axis 230 of the main housing 202. In this configuration, as the main housing 202 rotates about the rotational axis 230, the primary entrance tube 208 and the primary entrance housing 206 maintain a constant vertical position with respect to the main housing 202. Thus, the primary entrance slot 226, which the bees 201 have become accustomed to using, stays in the same position no matter the orientation of the main housing 202.

FIGS. 12A-12B depict a preferred embodiment of the primary entrance housing 206. The housing 206 comprises a primary entrance box 218 covered by a roof portion 220, which in a preferred embodiment is formed from sheet aluminum. A primary entrance aperture 224 is disposed in a sidewall of the box 218. The aperture 224 is preferably circular and has an inside diameter that is just slightly larger than the outside diameter of the primary entrance tube 208. Thus, when the primary entrance tube 208 is received into the aperture 224, the primary entrance tube 208 is free to rotate with respect to the primary entrance housing 206.

Bees 201 may enter the primary entrance housing 206 by passing through the primary entrance slot 226 disposed near the bottom surface of the box 218. Bees within the primary entrance housing 206 may enter the main housing 202 by passing through the primary entrance tube 208 and the main housing entrance aperture 266. The primary entrance housing 206 preferably includes a landing board 228 adjacent the entrance slot 226.

Figure 11A:
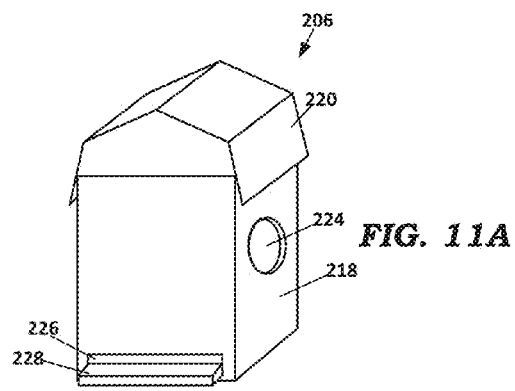
FIGS. 11A-11B and 12 depict a primary entrance housing of a preferred embodiment of a beehive.
Figure 11B:
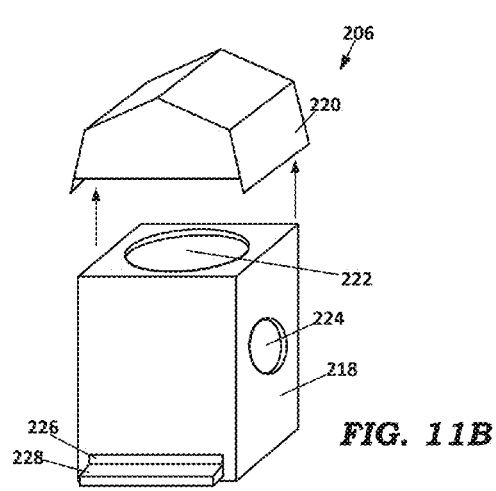
Figure 13:
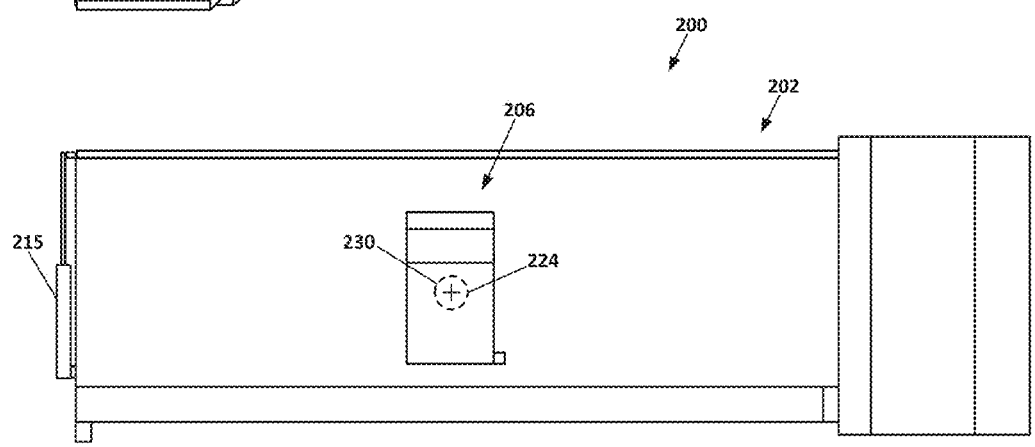
FIG. 13 depicts a preferred embodiment of a beehive in a horizontal orientation.
Figure 14A:
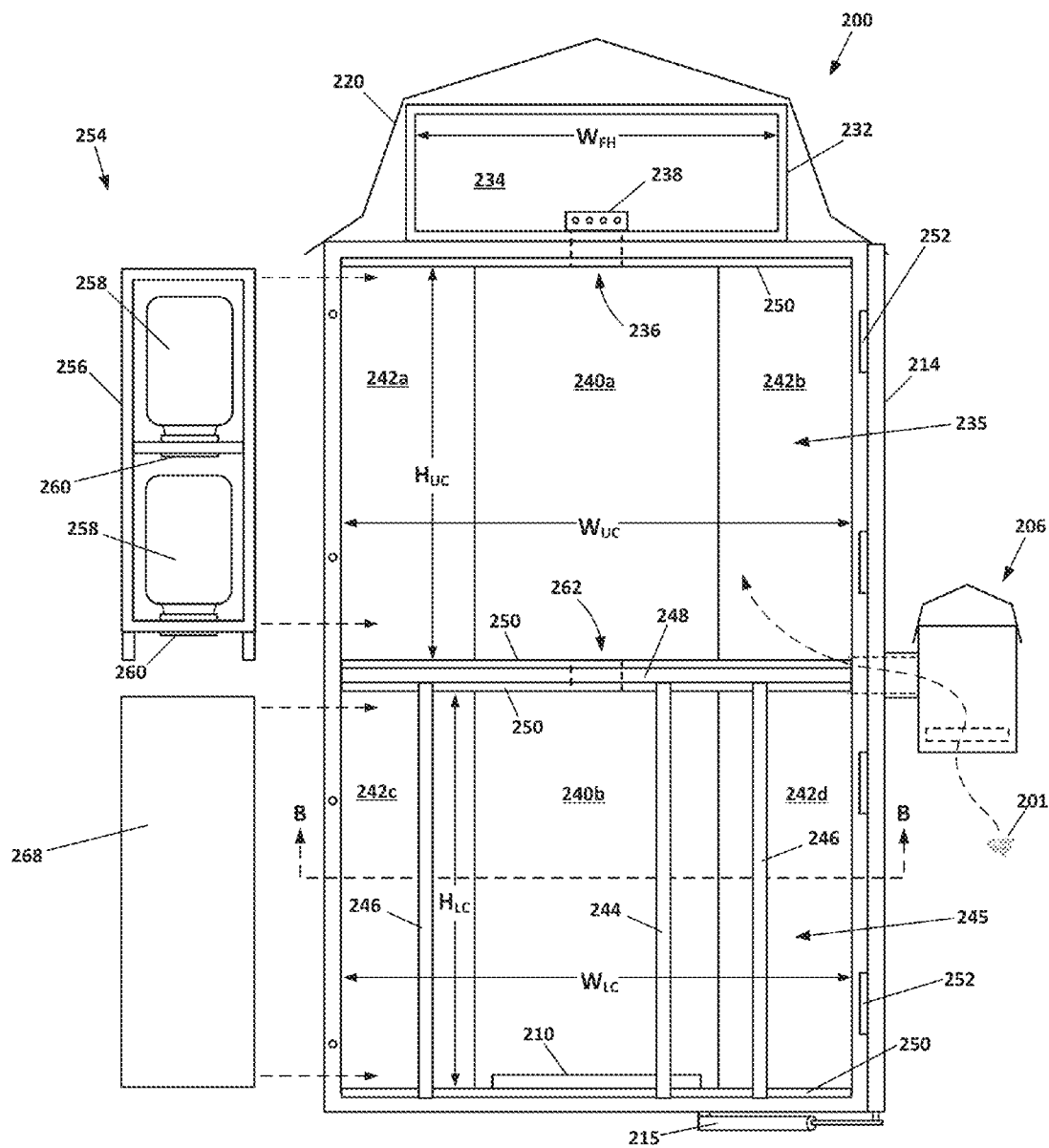

As shown in FIG. 11B, a preferred embodiment of the primary entrance housing 206 includes a feeder aperture 222 disposed in an upper surface of the box 218. The feeder aperture 222 is configured to receive the cap of an inverted feeder bottle for feeding the bees during the winter months. An example of a feeder bottle 258 with a cap 260 is shown in FIGS. 14A and 14C. As depicted in FIG. 11B, the feeder aperture 222 is accessed by removing the roof portion 220. In a preferred embodiment, the roof portion 220 is hinged to an edge of the top surface of the box 218, and the feeder aperture 222 is accessed by rotating the roof portion 220 back on the hinge. By providing a feeder bottle on the primary entrance housing 206 rather than inside the main housing 202, there is minimal disturbance to the bees and no space is taken up within the main housing 202 that could otherwise be used to hold honey frames.

FIGS. 14A-14D depict the preferred embodiment of the beehive 200 with the door 214 in the open position. The door is preferably held open by a pneumatic tube/piston system 215. As shown in FIG. 14A, the main housing 202 encloses an upper chamber 235 and a lower chamber 245 separated by a central divider wall 248. The preferred height $H_{UC}$ and $H_{LC}$ of the upper and lower chambers, respectively, is about 19.5 inches. The width $W_{UC}$ and $W_{LC}$ of the upper and lower chambers, respectively, preferably ranges from about 15 inches to about 36 inches and more preferably from about 20 inches to about 30 inches, and most preferably from about 23 inches to about 26 inches.

Figure 15:
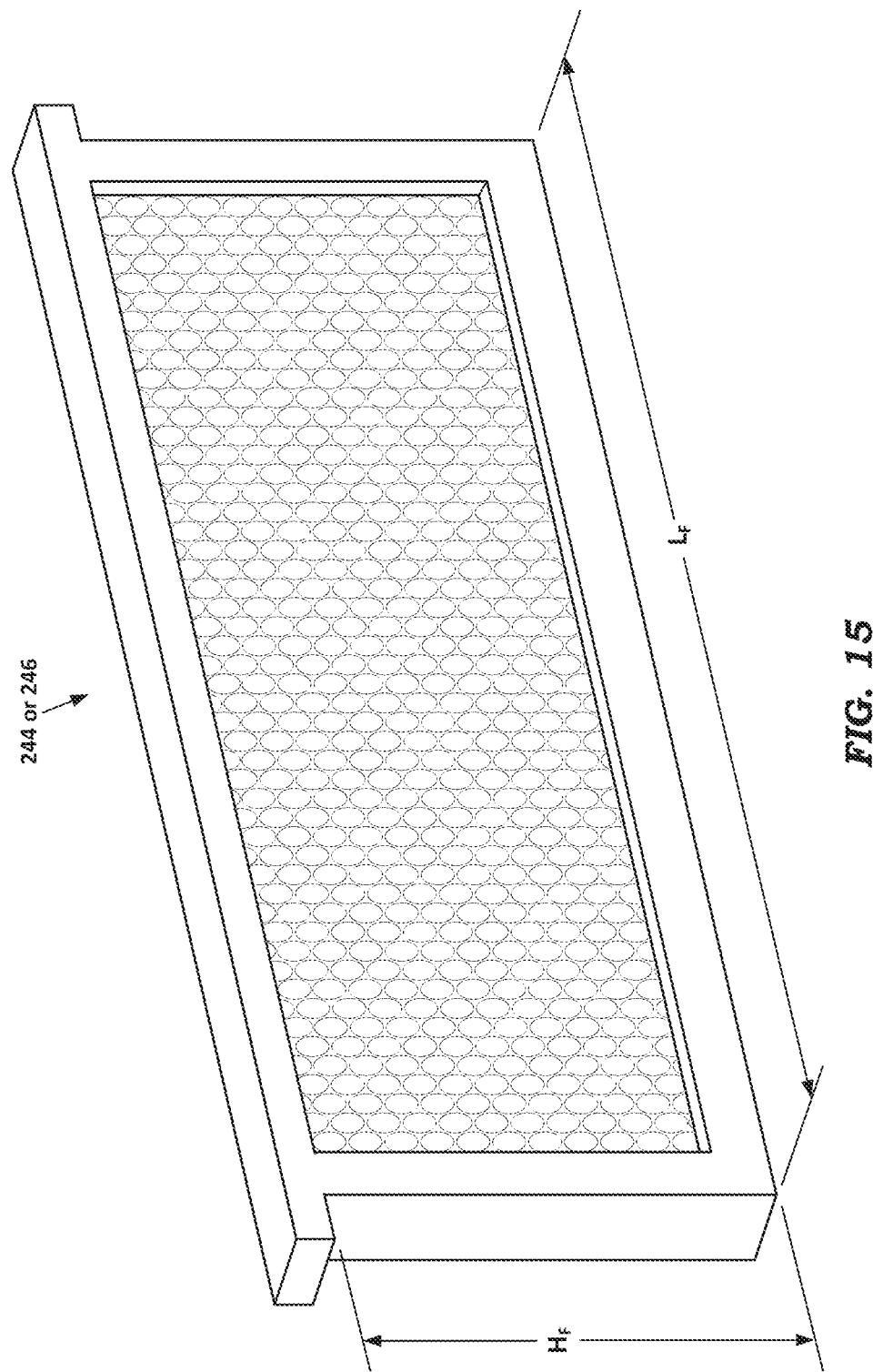
FIG. 15 depicts a Langstroth-style frame for a beehive.

Within the upper chamber 235 are two upper honey frame holding areas 242a and 242b disposed to either side of an upper brood frame holding area 240a. Similarly, within the lower chamber 245 are two lower honey frame holding areas 242c and 242d disposed to either side of a lower brood frame holding area 240b. As shown in the cross-section view of FIG. 14B, the preferred depth $D_{LC1}$ of the honey frame holding areas 242a-242d is about 6.63 inches, and the preferred depth $D_{LC2}$ of the brood frame holding areas 240a-240b is about 9.56 inches. With these preferred dimensions, the honey frame holding areas 242a-242d are configured to hold honey frames 246 having a length $L_F$ of 19.0 inches and a height $H_F$ of 6.25 inches, and the brood frame holding areas 240a-240b are configured to hold brood frames 244 having a length $L_F$ of 19.0 inches and a height $H_F$ of about 9.25 inches. (See FIG. 15.) These are the dimensions of standard-sized Langstroth medium (Illinois) honey frames and deep body brood frames. However, those of skill in the art will appreciate that the various beehive embodiments described herein could be modified to accommodate frames having other dimensions, and the invention is not limited to any particular dimensions for the frames or the holding areas for the frames. In a preferred embodiment, each honey frame holding area 242a-242d can hold five standard honey frames 246 side-by-side, and each brood frame holding area 240a-240b can hold eight standard brood frames 244 side-by-side. For the sake of simplicity of illustration, only one frame is shown in each of the frame holding areas 240b and 242c-242d depicted in FIGS. 14A and 14B. Ledges 250 are provided at each end of the upper and lower chambers 235 and 245 to support the tabs at each end of the frames 244 and 246.

As shown in FIGS. 14A and 14B, when the main housing 202 is disposed in the vertical position, the length dimension ($L_F$) of the frames 244 and 246 is vertical with respect to the ground and the height dimension ($H_F$) is horizontal. When the main housing 202 is disposed in the horizontal position (FIG. 13), the length dimension ($L_F$) of the frames 244 and 246 is horizontal with respect to the ground and the height dimension ($H_F$) is vertical.

With continued reference to FIGS. 14A and 14B, the central divider wall 248 has a central aperture 262 that provides a passageway for the queen bee to freely move between the upper chamber 235 and the lower chamber 245. Specifically, the queen has unrestricted movement from the top of the upper brood frame holding area 240a and to the bottom of the lower brood frame holding area 240b. This arrangement mimics natural conditions occurring within a hollow tree cavity, in which the brood area is naturally disposed between honey comb areas on either side, allowing the temperature and humidity of the brood area to be maintained at optimum levels for the queen.

As shown in FIG. 14B, several central slots 264 are provided through the central divider wall 248 to allow for ventilation between the upper and lower chambers. As shown in FIG. 14A, vent hole 236 is also provided in the upper wall of the upper chamber 235. A vent cap 238, which covers the vent hole 236, has holes large enough to allow ventilation through the cap but small enough to prevent their use as entrance/exit points for the bees.

As shown in FIG. 14A, a preferred embodiment of the beehive 200 includes a frame storage area 234 disposed beneath the roof 220 and above the upper chamber 235. The frame storage area has a width $W_{FH}$ that is substantially equivalent to the heights $H_{UC}$ and $H_{LC}$ of the upper and lower chambers. When the main housing 202 is disposed in the horizontal position for maintenance purposes, the beekeeper can use the frame storage area to hold frames that are temporarily removed from the upper or lower chambers. For example, when the beekeeper wishes to inspect the brood frames 244 within the brood frame holding areas 240a-240b without disturbing them, he may remove adjacent honey frames 246 from the honey frame holding areas and place those removed honey frames into the frame storage area 234. This is a significant advantage over prior art hives from which removed frames had to lay on the ground or be leaned against some other structure during the inspection process. The storage area 234 provides for minimal disturbance of the bees since it is configured to allow the frames to hang in substantially the same vertical position they were in before they were removed from the frame holding areas.

During winter months, it is generally desirable to remove some or all of the honey frames 246 while leaving some or all of the brood frames 244. As shown in FIGS. 14A and 14C, a preferred embodiment of the invention includes one or more spacer boxes 268 that may be placed in the honey frame holding area(s) 242a-242d from which the honey frames 246 have been removed to prevent bees from building honey comb within those areas. Preferably, the outer dimensions of the spacer boxes 268 are only slightly smaller than the dimensions of a honey frame holding areas 242a-242d.

It may also be desirable during winter months to provide a feeder within the main housing 202 of the beehive 200. As shown in FIGS. 14A and 14C, a preferred embodiment of the invention includes an inside feeder housing 256 that holds two feeder bottles 258, one above the other in a vertical arrangement. The perforated caps 260 of the feeder bottles 258 are held within two central apertures within the housing 256, one passing through the bottom surface of the housing 256 and the other passing through a central wall of the housing 256. Preferably, the outer dimensions of the inside feeder housing 256 are only slightly smaller than the dimensions of a honey frame holding area 242a-242d. In this configuration, the inside feeder housing 256 may also serve the same purpose as a spacer box 268.

Any of the various embodiments of support structures 18 and rotational elements 16 described above may be implemented to support and rotate the beehive 200. In one preferred embodiment, a hand-cranked trailer jack connected between the support structure and a side wall of the main housing 202 is used to rotate the beehive 200 between the horizontal and vertical positions.

The various schematic examples described herein are indicative of a broader range of specific embodiments of man-made bee housing apparatuses, all of which are used to provide easier access to a bee colony living inside such man-made bee housing. The reasons for gaining access vary, but often include taking honey from the bee colony, inspecting the health of the queen bee, and inspecting the health of the bee colony generally. Because beehives in nature are typically oriented in a substantially vertical orientation, the ability of the man-made bee housing examples described herein to be maintained in such a vertical orientation is more natural to bees living in such man-made bee housings. However, it is difficult to easily access conventional man-made bee housings such as, for example, Langstroth-style housings, that are maintained in a substantially vertical orientation. It is often necessary to manually lift and move portions of the bee housing to access the bee colony to remove honey. Typically, the brooding chamber or "brood box" is at the very bottom of such structures and requires that all layers be manually removed before the queen bee of a bee colony can be inspected. Thus, by providing a mechanism by which a man-made bee housing can be rotated to a substantially horizontal orientation and different sections of such bee housing can be accessed through doors or the like, it is much easier to maintain bee colonies and extract honey from such colonies.

The previously described schematic examples of the present disclosure have many advantages, including providing an easy way for a man-made bee housing to be inspected and for honey to be extracted therefrom. Significantly less strength and manual work is required to maintain such man-made bee housings because there is no need to manually lift and move multiple portions of bee housings as with, for example, common Langstroth beehives. Such benefits are particularly helpful for older, weaker, and/or physically handicapped individuals that maintain bee colonies for farming, as therapy, as a hobby, or other purposes. By using a gear assembly and/or a motor to rotate the primary enclosure of a man-made bee housing as disclosed herein, the advantages are further magnified because even less work is required for bee colony upkeep and honey farming. Various embodiments of man-made bee housings based on the teachings herein benefit from both the advantage of having a bee colony kept in a substantially vertical orientation most of the time as such colonies occur in nature while, at the same time, allowing for easy access to the different compartments of such bee colony when the primary enclosure of such bee housing is rotated to a substantially horizontal orientation.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What is claimed is:

1. A beehive comprising:
   a main housing comprising:
      an upper chamber having a height $H_{UC}$ and a width $W_{UC}$, the upper chamber comprising:
         a first upper honey frame holding area having a depth $D_{UC1}$ for holding first upper honey frames;
         a second upper honey frame holding area having the depth $D_{UC1}$ for holding second upper honey frames; and
         an upper brood frame holding area disposed between the first upper honey frame holding area and the second upper honey frame holding area, the upper brood frame holding area having a depth $D_{UC2}$ for holding upper brood frames;
      a lower chamber disposed beneath the upper chamber, the lower chamber having a height $H_{LC}$ and a width $W_{LC}$, the lower chamber comprising:
         a first lower honey frame holding area disposed below the first upper honey frame holding area, the first lower honey frame holding area having a depth $D_{LC1}$ for holding first lower honey frames;
         a second lower honey frame holding area disposed below the second upper honey frame holding area, the second lower honey frame holding area having the depth $D_{LC1}$ for holding second lower honey frames; and
         a lower brood frame holding area disposed between the first lower honey frame holding area and the second lower honey frame holding area, the lower brood frame holding area disposed below the upper brood frame holding area, the lower brood frame holding area having a depth $D_{LC2}$ for holding lower brood frames;
      a central divider wall disposed between the upper chamber and the lower chamber; and
      a central aperture passing through the central divider wall and connecting the upper chamber to the lower chamber, the central aperture providing a passage for a queen bee to move freely between the upper brood frame holding area and the lower brood frame holding area,
   wherein
      the depth $D_{UC2}$ of the upper brood frame holding area is greater than the depth $D_{UC1}$ of the first and second upper honey frame holding areas, such that the upper brood frame holding area may accommodate the upper brood frames having a greater depth than that of the first and second upper honey frames, and
      the depth $D_{LC2}$ of the lower brood frame holding area is greater than the depth $D_{LC1}$ of the first and second lower honey frame holding areas, such that the lower brood frame holding area may accommodate the lower brood frames having a greater depth than that of the first and second lower honey frames.

2. The beehive of claim 1 further comprising a roof disposed above the upper chamber.

3. The beehive of claim 2 further comprising a frame storage area disposed beneath the roof and above the upper chamber, the frame storage area having a width $W_{FH}$ that is substantially equivalent to the height $H_{UC}$ of the upper chamber and the height $H_{LC}$ of the lower chamber.

4. The beehive of claim 1 further comprising a vent aperture that provides an air passage between the upper chamber and the lower chamber.

5. The beehive of claim 1 further comprising at least one door attached to the main housing and moveable between an open position and a closed position, the at least one door covering the upper chamber and the lower chamber when the at least one door is in the closed position, and the at least one door providing access to the upper chamber and the lower chamber when the at least one door is in the open position.

6. The beehive of claim 1 further comprising a spacer box having a height that is substantially equivalent to the height $H_{UC}$ of the upper chamber or the height $H_{LC}$ of the lower chamber and a depth that is substantially equivalent to the depth $D_{UC1}$ of the first and second upper honey frame holding areas or to the depth $D_{LC1}$ of the first and second lower honey frame holding areas, the spacer box configured to occupy space within any of the honey frame holding areas during times when no honey frames are to be disposed in the honey frame holding areas.

7. The beehive of claim 1 further comprising an inside feeder housing configured to hold one or more bee feeder containers within any of the honey frame holding areas during times when no honey frames are to be disposed in the honey frame holding areas.

8. The beehive of claim 1 further comprising an entrance slot disposed adjacent a lowermost surface of the lower chamber, the entrance slot extending through the main housing and providing for ingress and egress of bees from the main housing of the beehive.

9. The beehive of claim 1 further comprising:
   a rotational axis disposed parallel and coincident with the central divider wall; and
   a rotation element upon which the main housing of the beehive is operable to rotate about the rotational axis from a substantially vertical position in which the upper chamber is disposed vertically above the lower chamber to a substantially horizontal position in which the upper chamber is disposed horizontally side-by-side with the lower chamber.

10. The beehive of claim 9 wherein
    one or both of the upper chamber and the lower chamber are configured to receive honey frames and brood frames each having a frame length dimension $L_F$ and a frame height dimension $H_F$, where the frame length dimension $L_F$ is greater than the frame height dimension $H_F$,
    when the main housing is in the substantially vertical position, the honey frames and brood frames are so disposed that their frame length dimension $L_F$ is disposed vertically and their frame height dimension $H_F$ is disposed horizontally, and
    when the main housing is in the substantially horizontal position, the honey frames and brood frames are so disposed that their frame length dimension $L_F$ is disposed horizontally and their frame height dimension $H_F$ is disposed vertically.

11. The beehive of claim 9 further comprising:
    a main housing entrance aperture extending through an outer wall of the main housing from an exterior of the main housing into one or both of the upper chamber and the lower chamber of the main housing;
    a primary entrance housing rotatably attached to the main housing adjacent the main housing entrance aperture, the primary entrance housing operable to rotate with respect to the main housing as the main housing rotates from the vertical position to the horizontal position with respect to a ground surface, the primary entrance housing including:
       a primary entrance slot disposed adjacent a lowermost surface of the primary entrance housing, the primary entrance slot extending through the primary entrance housing from an exterior of the primary entrance housing to an interior of the primary entrance housing, the primary entrance slot providing for ingress and egress of bees to and from the exterior to the interior of the primary entrance housing; and a primary entrance aperture extending through the primary entrance housing from the exterior of the primary entrance housing to the interior of the primary entrance housing; and a primary entrance tube connecting the main housing entrance aperture of the main housing to the primary entrance aperture of the primary entrance housing, the primary entrance tube providing a path of travel for bees to move between the primary entrance housing and the main housing, wherein bees may freely move from an exterior of the beehive, through the primary entrance slot into the interior of the primary entrance housing, and through the primary entrance aperture, the primary entrance tube, and the main housing entrance aperture to pass into one or both of the upper chamber and the lower chamber of the main housing.

12. The beehive of claim 11 wherein the primary entrance tube is rigidly affixed to the main housing, and the primary entrance housing is rotatably attached to the primary entrance tube.

13. The beehive of claim 12 wherein
the primary entrance tube is circular and has an outer diameter,
the primary entrance aperture is circular and has an inner diameter,
the outer diameter of the primary entrance tube is less than the inner diameter of the primary entrance aperture,
the primary entrance tube passes through the primary entrance aperture, and
the primary entrance tube is free to rotate within the primary entrance aperture as the main housing rotates between the vertical position and the horizontal position.

14. The beehive of claim 11 wherein the main housing entrance aperture, the primary entrance aperture of the primary entrance housing, and the primary entrance tube are all aligned with the rotational axis of the beehive.

15. The beehive of claim 11 wherein the main housing entrance aperture straddles the central divider wall, thereby providing openings into the upper chamber and the lower chamber of the main housing.

16. A beehive comprising:
a main housing having a rotational axis passing there through, the main housing comprising:
one or more chambers for holding honey frames and brood frames;
a main housing entrance aperture extending through an outer wall of the main housing from an exterior of the main housing into the one or more chambers;
a rotation element upon which the main housing of the beehive is operable to rotate about the rotational axis from a vertical position to a horizontal position with respect to a ground surface;
a primary entrance housing rotatably attached to the main housing adjacent the main housing entrance aperture, the primary entrance housing operable to rotate with respect to the main housing as the main housing rotates about its rotational axis from the vertical position to the horizontal position, the primary entrance housing including:
a primary entrance opening extending through the primary entrance housing from an exterior of the primary entrance housing to an interior of the primary entrance housing, the primary entrance opening providing for ingress and egress of bees to and from the exterior to the interior of the primary entrance housing; and
a primary entrance aperture extending through the primary entrance housing from the exterior of the primary entrance housing to the interior of the primary entrance housing; and
a primary entrance tube connecting the main housing entrance aperture of the main housing to the primary entrance aperture of the primary entrance housing, the primary entrance tube providing a path of travel for bees to move between the primary entrance housing and the main housing,
wherein bees may freely move from an exterior of the beehive, through the primary entrance opening into the interior of the primary entrance housing, and through the primary entrance aperture, the primary entrance tube, and the main housing entrance aperture to pass into the one or more chambers of the main housing.

17. The beehive of claim 16 wherein the primary entrance tube is rigidly affixed to the main housing, and the primary entrance housing is rotatably attached to the primary entrance tube.

18. The beehive of claim 17 wherein
the primary entrance tube is circular and has an outer diameter,
the primary entrance aperture is circular and has an inner diameter,
the outer diameter of the primary entrance tube is less than the inner diameter of the primary entrance aperture,
the primary entrance tube passes through the primary entrance aperture, and
the primary entrance tube is free to rotate within the primary entrance aperture as the main housing rotates between the vertical position and the horizontal position.

19. The beehive of claim 16 wherein the main housing entrance aperture, the primary entrance aperture of the primary entrance housing, and the primary entrance tube are all aligned with the rotational axis of the main housing.

20. The beehive of claim 16 wherein the primary entrance housing has a roof portion that substantially covers an upper portion of the primary entrance housing.

21. The beehive of claim 20 wherein the primary entrance housing further comprises:
a feeder aperture disposed beneath the roof portion, the feeder aperture for receiving a bee feeder container; and
the roof portion configured to be movable relative to the primary entrance housing or removable from the primary entrance housing to accommodate insertion of the bee feeder container into the feeder aperture.

22. The beehive of claim 21 wherein the roof portion is hinged to the primary entrance housing.

* * * * *